(12) United States Patent
Sanchez-Rosito et al.

(10) Patent No.: US 12,474,178 B2
(45) Date of Patent: Nov. 18, 2025

(54) TRANSFORMING AND NAVIGATING HISTORICAL MAP IMAGES

(71) Applicant: Ancestry.com Operations Inc., Lehi, UT (US)

(72) Inventors: Ivan Augusto Sanchez-Rosito, Spanish Fork, UT (US); Syed Zahid Khadri, Mountain View, CA (US); Marisa Brooke Jensen, Lehi, UT (US); Monica Niehaus, San Francisco, CA (US); Brett Johnson, Saratoga Springs, UT (US); Kaleb Benjamin White, Herriman, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 448 days.

(21) Appl. No.: 18/113,427

(22) Filed: Feb. 23, 2023

(65) Prior Publication Data

US 2023/0296398 A1  Sep. 21, 2023

Related U.S. Application Data

(60) Provisional application No. 63/321,412, filed on Mar. 18, 2022.

(51) Int. Cl.
*G01C 21/00* (2006.01)

(52) U.S. Cl.
CPC ....... *G01C 21/3807* (2020.08); *G01C 21/005* (2013.01)

(58) Field of Classification Search
CPC . G06T 2200/24; G06T 11/60; G01C 21/3807; G01C 21/005; G06F 3/04845;
(Continued)

(56) References Cited

U.S. PATENT DOCUMENTS

| 4,201,386 A | 5/1980 | Seale et al. |
| 5,115,504 A | 5/1992 | Belove et al. |

(Continued)

FOREIGN PATENT DOCUMENTS

WO    WO 2008/042232 A2    4/2008

OTHER PUBLICATIONS

Butler, J. M., "Commonly Used Short Tandem Repeat Markers," Forensic DNA Typing, Academic Press, Chapter 5, 2001, pp. 53-54.
(Continued)

*Primary Examiner* — Phi Hoang
(74) *Attorney, Agent, or Firm* — Keller Preece PLLC

(57) ABSTRACT

Systems and methods for transforming and navigating historical map images are presented. The systems and methods embodiments facilitate providing, searching for, retrieving, transforming, and/or navigating a historical map image vis-à-vis a modern location and/or map. A map interface facilitates automatedly overlaying, annotating, and aligning a historical map image(s) with a modern map, allowing a user to search for a location and see the same in the historical map image, and change a visibility of the overlaid and aligned map images relative to each other. The map interface provides user interactions that facilitate retrieving, viewing, and manipulating records, historical districts, and other pertinent data through interacting with a particular location and/or searched-for individual, such as an ancestor or other person of interest.

16 Claims, 11 Drawing Sheets

(58) Field of Classification Search
CPC ....... G06F 3/04847; G06F 2203/04804; G06F 16/9537; G06F 16/24573; G06F 16/29
See application file for complete search history.

(56) References Cited

U.S. PATENT DOCUMENTS

| | | | |
|---|---|---|---|
| 5,246,374 A | 9/1993 | Boodram | |
| 5,413,908 A | 5/1995 | Jeffreys | |
| 5,467,471 A | 11/1995 | Bader | |
| 5,978,811 A | 11/1999 | Smiley | |
| 6,049,803 A | 4/2000 | Szalwinski | |
| 6,105,147 A | 8/2000 | Molloy | |
| 6,277,567 B1 | 8/2001 | Graziosi | |
| 6,528,260 B1 | 3/2003 | Blumenfeld et al. | |
| 6,570,567 B1 | 5/2003 | Eaton | |
| 7,957,907 B2 | 6/2011 | Sorenson et al. | |
| 8,738,297 B2 | 5/2014 | Sorenson et al. | |
| 8,855,935 B2 | 10/2014 | Myres et al. | |
| 8,937,546 B1* | 1/2015 | Baron, Sr. | G08B 21/10 340/901 |
| 9,465,890 B1* | 10/2016 | Wilson | G06F 16/9038 |
| 10,572,831 B1 | 2/2020 | Do et al. | |
| 2003/0113727 A1 | 6/2003 | Girn et al. | |
| 2003/0172065 A1 | 9/2003 | Sorenson et al. | |
| 2003/0204418 A1 | 10/2003 | Ledley | |
| 2004/0122705 A1 | 6/2004 | Sabol et al. | |
| 2004/0229231 A1 | 11/2004 | Frudakis et al. | |
| 2004/0243531 A1 | 12/2004 | Dean | |
| 2005/0073532 A1* | 4/2005 | Scott | G06Q 10/06 345/634 |
| 2006/0020398 A1 | 1/2006 | Vernon et al. | |
| 2006/0136143 A1 | 6/2006 | Avinash et al. | |
| 2006/0161535 A1 | 7/2006 | Holbrook | |
| 2007/0037182 A1 | 2/2007 | Gaskin et al. | |
| 2008/0154566 A1 | 6/2008 | Myres et al. | |
| 2009/0210388 A1* | 8/2009 | Elson | G06F 16/29 |
| 2011/0264529 A1* | 10/2011 | Conlan | G01S 19/19 715/764 |
| 2015/0019543 A1* | 1/2015 | Dzubay | G06F 16/29 707/724 |
| 2015/0100243 A1 | 4/2015 | Myres et al. | |
| 2016/0225057 A1 | 8/2016 | Pellow et al. | |
| 2017/0052672 A1 | 2/2017 | Forstall et al. | |
| 2017/0329891 A1 | 11/2017 | Macpherson et al. | |
| 2018/0005454 A1* | 1/2018 | Suni | G06T 17/05 |
| 2018/0356560 A1* | 12/2018 | Averbuch | G01W 1/10 |
| 2019/0247326 A1 | 8/2019 | Ho et al. | |
| 2023/0025175 A1 | 1/2023 | Pigg et al. | |
| 2023/0109923 A1* | 4/2023 | Suckle | G06F 16/9558 707/737 |
| 2023/0124878 A1* | 4/2023 | Gray | G06F 16/9536 707/722 |

OTHER PUBLICATIONS

Corach, D. et al., "Mass disasters: Rapid molecular screening of human remains by means of short tandem repeats typing," Electrophoresis, vol. 16, No. 1, Sep. 1995, pp. 1617-1623.
Family Tree DNA. "Family Tree DNA." Family Tree DNA: Genealogy by Genetics, LTD., Feb. 5, 2001, 2 pages, [Online] [Retrieved Aug. 1, 2023], Retrieved from the Internet Archive <URL:https://web.archive.org/web/20010205000900/http://www.familytreedna.com/main.html>.
Mapbox. "Querying Features." Mapbox GL JS: Map, Jun. 4, 2020, 22 pages, [Online] [Retrieved Aug. 28, 2023], Retrieved from the Internet <URL:https://docs.mapbox.com/mapbox-gl-js/api/map/#map#queryrenderedfeatures>.
Merriam-Webster. "Genealogy." Merriam-Webster Online Dictionary, Apr. 23, 2009, 1 page, [Online] [Retrieved Aug. 1, 2023], Retrieved from the Internet Archive <URL:https://web.archive.org/web/20090423124015/https://www.merriam-webster.com/dictionary/genealogy>.
Oxford Ancestors. "Oxford Ancestors: We Put the Genes in Genealogy." Oxfordancestors.com, Feb. 24, 2001, 3 pages, [Online] [Retrieved Aug. 1, 2023], Retrieved from the Internet Archive <URL:https://web.archive.org/web/20010224164734/http://www.oxfordancestors.com/>.
Pugh, M. B. et al., "Stedman's Medical Dictionary." Lippincott Williams & Wilkins, 27th Edition, 2000, p. 703.
Sanchez, I. "(un)Loading Raster and Vector Tilesets." Confluence, 1950 Census: Georeferenced Maps, Feb. 14, 2022, pp. 1-2.
Sanchez, I. "1950 Census Georeferenced Maps: Content-Provided Files." Confluence, 1950 Census: Georeferenced Maps, Apr. 1, 2022, pp. 1-2.
Sanchez, I. "Clustering on Enumeration District Maps." Confluence, 1950 Census: Georeferenced Maps, Dec. 6, 2021, p. 1.
Sanchez, I. "Georeferenced Maps." Confluence: 1950 Census, Feb. 28, 2022, p. 1.
Sanchez, I. "Localization." Confluence, Confluence, 1950 Census: Georeferenced Maps, Jan. 24, 2022, p. 1.
Sanchez, I. "Map Experience to IIV." Confluence, 1950 Census: Georeferenced Maps, Feb. 28, 2022, p. 1.
Sanchez, I. "Raster Map Z Ordering." Confluence, 1950 Census: Georeferenced Maps, Jan. 4, 2022, p. 1.
Sanchez, I. "User Interaction w/ District Polygons." Confluence, 1950 Census: Georeferenced Maps, Dec. 10, 2021, pp. 1-2.
Wilson, I. J. et al., "Genealogical Inference from Microsatellite Data," Genetics, vol. 150, Sep. 1998, pp. 499-510.

* cited by examiner

FIG. 8B

TRANSFORMING AND NAVIGATING HISTORICAL MAP IMAGES

CROSS-REFERENCE TO RELATED APPLICATION

The present application claims the benefit of U.S. Provisional Patent Application No. 63/321,412 filed on Mar. 18, 2022, which is hereby incorporated by reference in its entirety.

FIELD

The disclosed embodiments relate to relate to systems, methods, and/or computer-program products configured for receiving, transforming, and navigating historical map images, particularly in cooperation with modern map images.

BACKGROUND

A large-scale database such as a genealogy database can include billions of data records. This type of database may allow users to build family trees, research their family history, and make meaningful discoveries about the lives of their ancestors. Users may try to identify relatives with datasets in the database. However, identifying relatives in the sheer amount of data is not a trivial task. Datasets associated with different individuals may not be connected without a proper determination of how the datasets are related. Comparing a large number of datasets without a concrete strategy may also be computationally infeasible because each dataset may also include a large number of data bits. Given an individual dataset and a database with datasets that are potentially related to the individual dataset, it is often challenging to identify a dataset in the database that is associated with the individual dataset.

Historical maps have rich information that is of interest to genealogical researchers. However, historical map images are difficult to identify, access, and navigate, particularly with respect to a particular location and/or person of interest. The historical map images are not indexed to specific locations so as to facilitate a meaningful comparison between the information in the historical map image and a modem location.

A genealogical researcher or a user of a genealogical research service, for example, intending to provide would be obliged to first locate and peruse manually repositories of historical map images, and, upon identifying a potentially pertinent historical map image, navigate manually the historical map image. The manual navigation process includes a painstaking and time-consuming process of attempting to align, scale, and correct the historical map image to modern locations and landmarks.

SUMMARY

Disclosed herein relates to methods, processes, and systems for overlying digitalized images of physical historical maps onto an interactive digital map. For example, in an interactive digital map, a user may provide a query that specifies one or more characteristics of a subject, which can be names, year of birth, place of birth, or employment records. Alternatively, the user query can be geological information of a subject, which can be a physical address, a city, or Census enumeration district (ED) information. In response, the system conducts a search to identify and retrieve one or more digitalized historical map images stored in an index. The interactive digital map then overlays the one or more digitalized historical map images onto the interactive digital map.

More specifically, in accordance with an embodiment, a computer-implemented method is described. The method comprising: loading a digital map; loading an index comprising historical map metadata, wherein the historical map metadata comprise boundary coordinates of historical maps and identifiers of historical map images, the historical map images being digitalized images of physical maps; receiving a user input interacting with the digital map; determining, based on the user input, a view area of the digital map, the view area corresponding to a geographical area and a zoom level on the digital map; looking up the index to determine one or more particular historical maps that fall within the view area of the digital map, looking up the index comprising examining whether the boundary coordinates of the historical maps fall within the geographical area corresponding to the view area at the zoom level; retrieving, from a data source and based on the identifiers of historical map images stored in the index, one or more historical map images corresponding to the one or more particular historical maps that fall within the view area of the digital map; and overlaying the one or more historical map images onto the digital map. In certain embodiments, the method further comprises looking up and retrieving, from a data source, the historical map data that is to be overlayed onto the digital map in the user's current view area.

In yet another embodiment, a non-transitory computer-readable medium that is configured to store instructions is described. The instructions, when executed by one or more processors, cause the one or more processors to perform a process that includes steps described in the above computer-implemented methods or described in any embodiments of this disclosure. In yet another embodiment, a system may include one or more processors and a storage medium that is configured to store instructions. The instructions, when executed by one or more processors, cause the one or more processors to perform a process that includes steps described in the above computer-implemented methods or described in any embodiments of this disclosure.

BRIEF DESCRIPTION OF THE DRAWINGS

Figure (FIG.) 1 illustrates a diagram of a system environment of an example computing system, in accordance with some embodiments.

FIG. 8B illustrates a genealogy record browser that is launched in response to a user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The figures (FIGs.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

In some embodiments, described herein is a system for processing the steps described in the computer-implemented methods or described in any embodiments of this disclosure. The system includes a computing server comprising memory that stores an index, which includes historical map metadata. Specifically, the historical map metadata provide boundary coordinates of historical maps and identifiers of digitalized images of the physical historical maps (e.g., historical map images). Additionally, the system includes a user interface in communication with the computing server and to display one or more historical map images overlaid on the digital map. The system is configured to provide a mapping experience which allows users the ability to search and browse a geolocation (e.g., the United States) on a map and quickly find historical information (e.g., 1950 US Census enumeration district (ED) information.

Example System Environment

Figure 1:
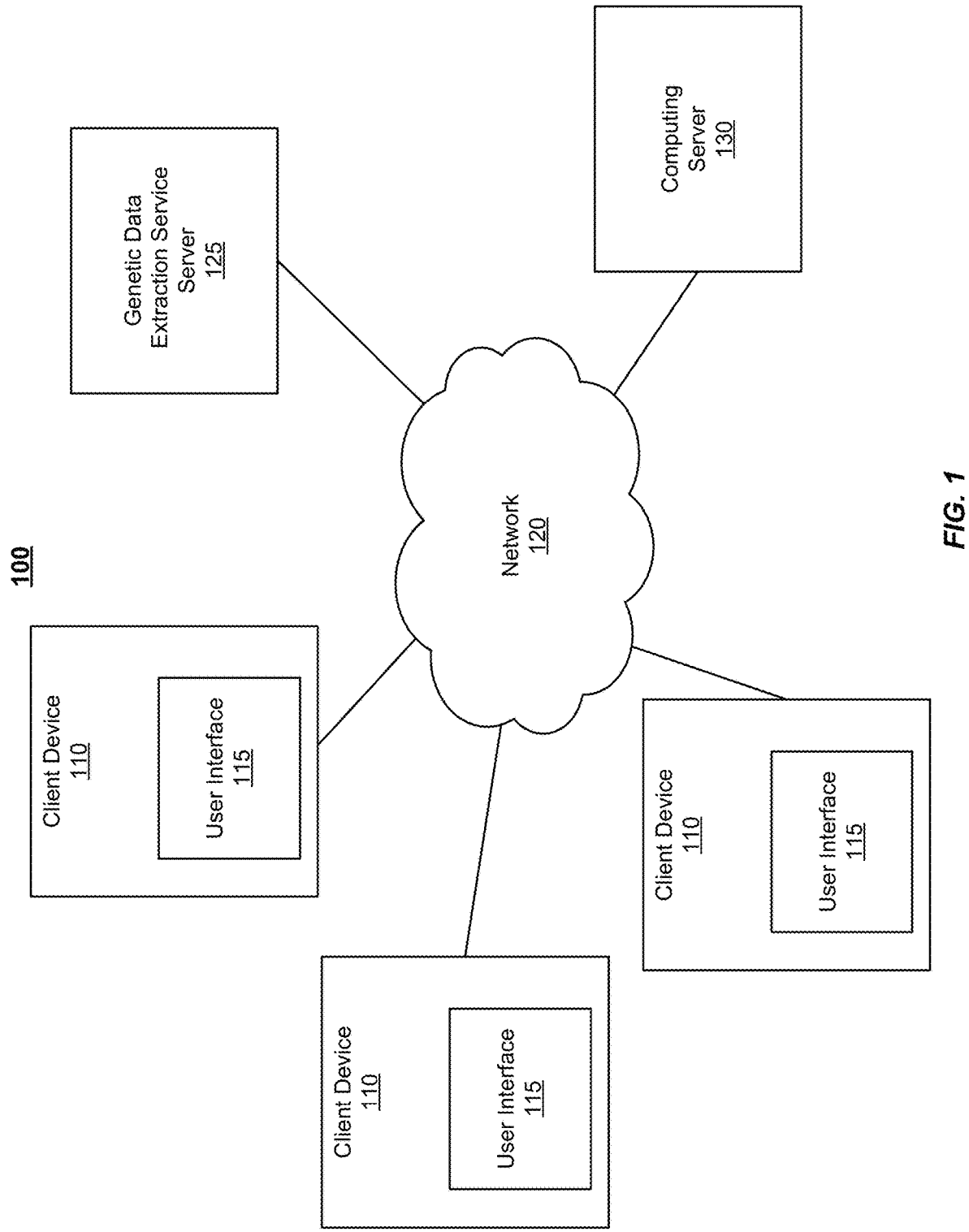

FIG. 1 illustrates a diagram of a system environment 100 of an example computing server 130, in accordance with some embodiments. The system environment 100 shown in FIG. 1 includes one or more client devices 110, a network 120, a genetic data extraction service server 125, and a computing server 130. In various embodiments, the system environment 100 may include fewer or additional components. The system environment 100 may also include different components.

The client devices 110 are one or more computing devices capable of receiving user input as well as transmitting and/or receiving data via a network 120. Example computing devices include desktop computers, laptop computers, personal digital assistants (PDAs), smartphones, tablets, wearable electronic devices (e.g., smartwatches), smart household appliances (e.g., smart televisions, smart speakers, smart home hubs), Internet of Things (IoT) devices or other suitable electronic devices. A client device 110 communicates to other components via the network 120. Users may be customers of the computing server 130 or any individuals who access the system of the computing server 130, such as an online website or a mobile application. In some embodiments, a client device 110 executes an application that launches a graphical user interface (GUI) for a user of the client device 110 to interact with the computing server 130. The GUI may be an example of a user interface 115. A client device 110 may also execute a web browser application to enable interactions between the client device 110 and the computing server 130 via the network 120. In another embodiment, the user interface 115 may take the form of a software application published by the computing server 130 and installed on the user device 110. In yet another embodiment, a client device 110 interacts with the computing server 130 through an application programming interface (API) running on a native operating system of the client device 110, such as IOS or ANDROID. In some embodiments, the user interface 115 may take the form of a map interface that display various historical maps overlaid with a digital map in a manner that will be further described in FIG. 3 through FIG. 9 (900).

The network 120 provides connections to the components of the system environment 100 through one or more sub-networks, which may include any combination of local area and/or wide area networks, using both wired and/or wireless communication systems. In some embodiments, a network 120 uses standard communications technologies and/or protocols. For example, a network 120 may include communication links using technologies such as Ethernet, 802.11, worldwide interoperability for microwave access (WiMAX), 3G, 4G, Long Term Evolution (LTE), 5G, code division multiple access (CDMA), digital subscriber line (DSL), etc. Examples of network protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 120 may be represented using any suitable format, such as hypertext markup language (HTML) or extensible markup language (XML). In some embodiments, all or some of the communication links of a network 120 may be encrypted using any suitable technique or techniques such as secure sockets layer (SSL), transport layer security (TLS), virtual private networks (VPNs), Internet Protocol security (IPsec), etc. The network 120 also includes links and packet switching networks such as the Internet.

Individuals, who may be customers of a company operating the computing server 130, provide biological samples for analysis of their genetic data. Individuals may also be referred to as users. In some embodiments, an individual uses a sample collection kit to provide a biological sample (e.g., saliva, blood, hair, tissue) from which genetic data is extracted and determined according to nucleotide processing techniques such as amplification and sequencing. Amplification may include using polymerase chain reaction (PCR) to amplify segments of nucleotide samples. Sequencing may include sequencing of deoxyribonucleic acid (DNA) sequencing, ribonucleic acid (RNA) sequencing, etc. Suitable sequencing techniques may include Sanger sequencing and massively parallel sequencing such as various next-generation sequencing (NGS) techniques including whole genome sequencing, pyrosequencing, sequencing by synthesis, sequencing by ligation, and ion semiconductor sequencing. In some embodiments, a set of SNPs (e.g., 300,000) that are shared between different array platforms (e.g., Illumina OmniExpress Platform and Illumina HumanHap 650Y Platform) may be obtained as genetic data. Genetic data extraction service server 125 receives biological samples from users of the computing server 130. The genetic data extraction service server 125 performs sequencing of the biological samples and determines the base pair sequences of the individuals. The genetic data extraction service server 125 generates the genetic data of the individuals based on the sequencing results. The genetic data may include data sequenced from DNA or RNA and may include base pairs from coding and/or noncoding regions of DNA.

The genetic data may take different forms and include information regarding various biomarkers of an individual. For example, in some embodiments, the genetic data may be the base pair sequence of an individual. The base pair sequence may include the whole genome or a part of the genome such as certain genetic loci of interest. In another embodiment, the genetic data extraction service server 125 may determine genotypes from sequencing results, for example by identifying genotype values of single nucleotide polymorphisms (SNPs) present within the DNA. The results in this example may include a sequence of genotypes corresponding to various SNP sites. A SNP site may also be referred to as a SNP locus. A genetic locus is a segment of a genetic sequence. A locus can be a single site or a longer stretch. The segment can be a single base long or multiple bases long. In some embodiments, the genetic data extraction service server 125 may perform data pre-processing of the genetic data to convert raw sequences of base pairs to sequences of genotypes at target SNP sites. Since a typical human genome may differ from a reference human genome at only several million SNP sites (as opposed to billions of base pairs in the whole genome), the genetic data extraction service server 125 may extract only the genotypes at a set of target SNP sites and transmit the extracted data to the computing server 130 as the genetic dataset of an individual. SNPs, base pair sequence, genotype, haplotype, RNA sequences, protein sequences, and phenotypes are examples of biomarkers.

The computing server 130 performs various analyses of the genetic data, genealogy data, and users' survey responses to generate results regarding the phenotypes and genealogy of users of computing server 130. Depending on the embodiments, the computing server 130 may also be referred to as an online server, a personal genetic service server, a genealogy server, a family tree building server, and/or a social networking system. The computing server 130 receives genetic data from the genetic data extraction service server 125 and stores the genetic data in the data store of the computing server 130. The computing server 130 may analyze the data to generate results regarding the genetics or genealogy of users. The results regarding the genetics or genealogy of users may include the ethnicity compositions of users, paternal and maternal genetic analysis, identification or suggestion of potential family relatives, ancestor information, analyses of DNA data, potential or identified traits such as phenotypes of users (e.g., diseases, appearance traits, other genetic characteristics, and other non-genetic characteristics including social characteristics), etc. The computing server 130 may present or cause the user interface 115 to present the results to the users through a GUI displayed at the client device 110. The results may include graphical elements, textual information, data, charts, and other elements such as family trees.

In some embodiments, the computing server 130 also allows various users to create one or more genealogical profiles of the user. The genealogical profile may include a list of individuals (e.g., ancestors, relatives, friends, and other people of interest) who are added or selected by the user or suggested by the computing server 130 based on the genealogical records and/or genetic records. The user interface 115 controlled by or in communication with the computing server 130 may display the individuals in a list or as a family tree such as in the form of a pedigree chart. In some embodiments, subject to user's privacy setting and authorization, the computing server 130 may allow information generated from the user's genetic dataset to be linked to the user profile and to one or more of the family trees. The users may also authorize the computing server 130 to analyze their genetic dataset and allow their profiles to be discovered by other users.

Example Computing Server Architecture

Figure 2:
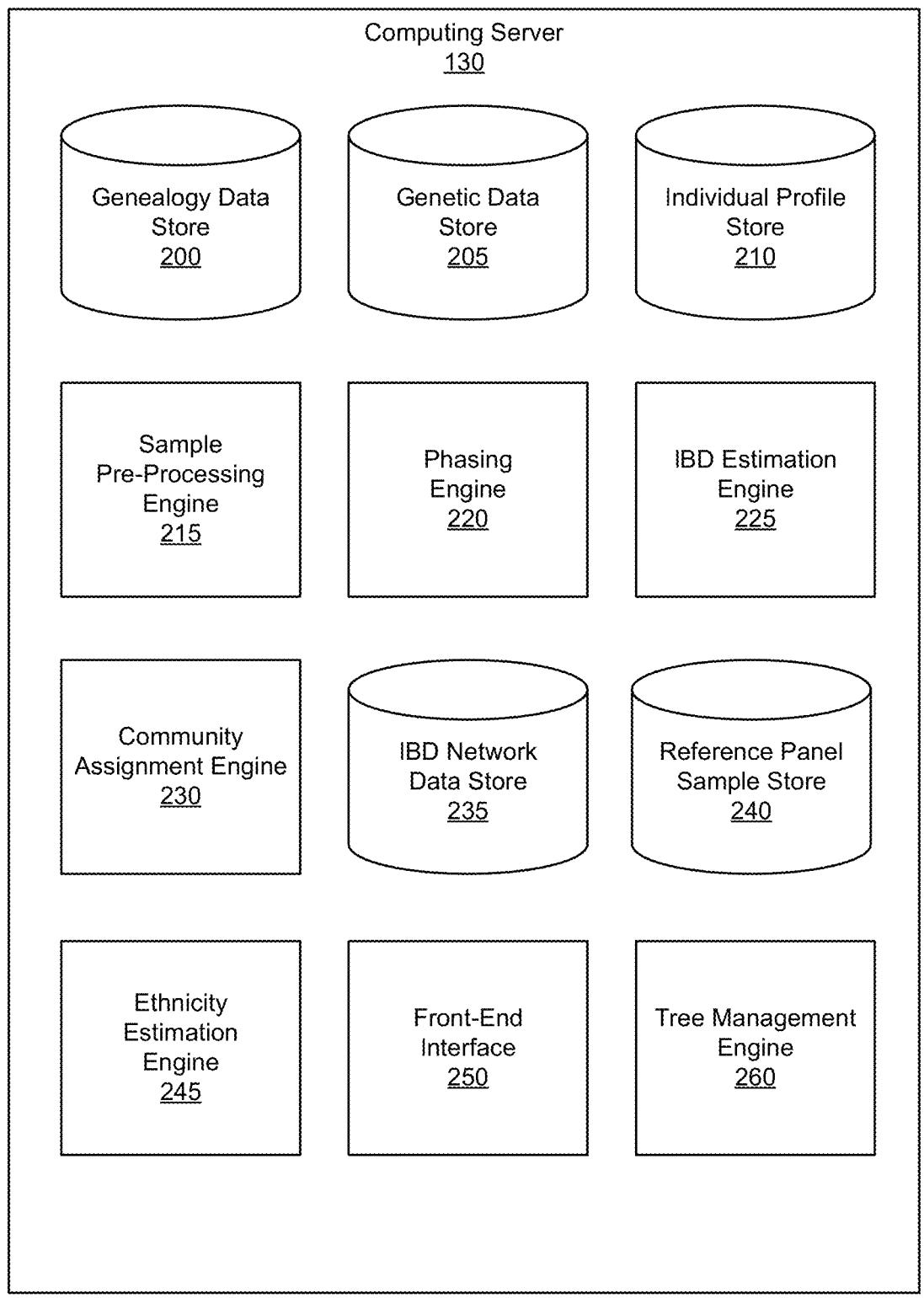
FIG. 2 is a block diagram of an architecture of an example computing system, in accordance with some embodiments.

FIG. 2 is a block diagram (130) of an architecture of an example computing server 130, in accordance with some embodiments. In the embodiment shown in FIG. 2, the computing server 130 includes a genealogy data store 200, a genetic data store 205, an individual profile store 210, a sample pre-processing engine 215, a phasing engine 220, an identity by descent (IBD) estimation engine 225, a community assignment engine 230, an IBD network data store 235, a reference panel sample store 240, an ethnicity estimation engine 245, a front-end interface 250, and a tree management engine 260. The functions of the computing server 130 may be distributed among the elements in a different manner than described. In various embodiments, the computing server 130 may include different components and fewer or additional components. Each of the various data stores may be a single storage device, a server controlling multiple storage devices, or a distributed network that is accessible through multiple nodes (e.g., a cloud storage system).

The computing server 130 stores various data of different individuals, including genetic data, genealogy data, and survey response data. The computing server 130 processes the genetic data of users to identify shared identity-by-descent (IBD) segments between individuals. The genealogy data and survey response data may be part of user profile data. The amount and type of user profile data stored for each user may vary based on the information of a user, which is provided by the user as she creates an account and profile at a system operated by the computing server 130 and continues to build her profile, family tree, and social network at the system and to link her profile with her genetic data. Users may provide data via the user interface 115 of a client device 110. Initially and as a user continues to build her genealogical profile, the user may be prompted to answer questions related to the basic information of the user (e.g., name, date of birth, birthplace, etc.) and later on more advanced questions that may be useful for obtaining additional genealogy data. The computing server 130 may also include survey questions regarding various traits of the users such as the users' phenotypes, characteristics, preferences, habits, lifestyle, environment, etc.

Genealogy data may be stored in the genealogy data store 200 and may include various types of data that are related to tracing family relatives of users. Examples of genealogy data include names (first, last, middle, suffixes), gender, birth locations, date of birth, date of death, marriage information, spouse's information kinships, family history, dates and places for life events (e.g., birth and death), other vital data, and the like. In some instances, family history can take the form of a pedigree of an individual (e.g., the recorded relationships in the family). The family tree information associated with an individual may include one or more specified nodes. Each node in the family tree represents the individual, an ancestor of the individual who might have passed down genetic material to the individual, and the individual's other relatives including siblings, cousins, and offspring in some cases. Genealogy data may also include connections and relationships among users of the computing server 130. The information related to the connections among a user and her relatives that may be associated with a family tree may also be referred to as pedigree data or family tree data.

In addition to user-input data, genealogy data may also take other forms that are obtained from various sources such as public records and third-party data collectors. For example, genealogical records from public sources include birth records, marriage records, death records, census records, court records, probate records, adoption records, obituary records, etc. Likewise, genealogy data may include data from one or more family trees of an individual, the Ancestry World Tree system, a Social Security Death Index database, the World Family Tree system, a birth certificate database, a death certificate database, a marriage certificate database, an adoption database, a draft registration database, a veterans database, a military database, a property records database, a census database, a voter registration database, a phone database, an address database, a newspaper database, an immigration database, a family history records database, a local history records database, a business registration database, a motor vehicle database, and the like.

Furthermore, the genealogy data store 200 may also include relationship information inferred from the genetic data stored in the genetic data store 205 and information received from the individuals. For example, the relationship information may indicate which individuals are genetically related, how they are related, how many generations back they share common ancestors, lengths and locations of IBD segments shared, which genetic communities an individual is a part of, variants carried by the individual, and the like.

The computing server 130 maintains genetic datasets of individuals in the genetic data store 205. A genetic dataset of an individual may be a digital dataset of nucleotide data (e.g., SNP data) and corresponding metadata. A genetic dataset may contain data on the whole or portions of an individual's genome. The genetic data store 205 may store a pointer to a location associated with the genealogy data store 200 associated with the individual. A genetic dataset may take different forms. In some embodiments, a genetic dataset may take the form of a base pair sequence of the sequencing result of an individual. A base pair sequence dataset may include the whole genome of the individual (e.g., obtained from a whole-genome sequencing) or some parts of the genome (e.g., genetic loci of interest).

In another embodiment, a genetic dataset may take the form of sequences of genetic markers. Examples of genetic markers may include target SNP loci (e.g., allele sites) filtered from the sequencing results. A SNP locus that is single base pair long may also be referred to as a SNP site. A SNP locus may be associated with a unique identifier. The genetic dataset may be in a form of diploid data that includes a sequencing of genotypes, such as genotypes at the target SNP loci, or the whole base pair sequence that includes genotypes at known SNP loci and other base pair sites that are not commonly associated with known SNPs. The diploid dataset may be referred to as a genotype dataset or a genotype sequence. Genotype may have a different meaning in various contexts. In one context, an individual's genotype may refer to a collection of diploid alleles of an individual. In other contexts, a genotype may be a pair of alleles present on two chromosomes for an individual at a given genetic marker such as a SNP site.

Genotype data for a SNP site may include a pair of alleles. The pair of alleles may be homozygous (e.g., A-A or G-G) or heterozygous (e.g., A-T, C-T). Instead of storing the actual nucleotides, the genetic data store 205 may store genetic data that are converted to bits. For a given SNP site, oftentimes only two nucleotide alleles (instead of all 4) are observed. As such, a 2-bit number may represent a SNP site. For example, 00 may represent homozygous first alleles, 11 may represent homozygous second alleles, and 01 or 10 may represent heterozygous alleles. A separate library may store what nucleotide corresponds to the first allele and what nucleotide corresponds to the second allele at a given SNP site.

A diploid dataset may also be phased into two sets of haploid data, one corresponding to a first parent side and another corresponding to a second parent side. The phased datasets may be referred to as haplotype datasets or haplotype sequences. Similar to genotype, haplotype may have a different meaning in various contexts. In one context, a haplotype may also refer to a collection of alleles that corresponds to a genetic segment. In other contexts, a haplotype may refer to a specific allele at a SNP site. For example, a sequence of haplotypes may refer to a sequence of alleles of an individual that are inherited from a parent.

The individual profile store 210 stores profiles and related metadata associated with various individuals appeared in the computing server 130. A computing server 130 may use unique individual identifiers to identify various users and other non-users that might appear in other data sources such as ancestors or historical persons who appear in any family tree or genealogy database. A unique individual identifier may be a hash of certain identification information of an individual, such as a user's account name, user's name, date of birth, location of birth, or any suitable combination of the information. The profile data related to an individual may be stored as metadata associated with an individual's profile. For example, the unique individual identifier and the metadata may be stored as a key-value pair using the unique individual identifier as a key.

An individual's profile data may include various kinds of information related to the individual. The metadata about the individual may include one or more pointers associating genetic datasets such as genotype and phased haplotype data of the individual that are saved in the genetic data store 205. The metadata about the individual may also be individual information related to family trees and pedigree datasets that include the individual. The profile data may further include declarative information about the user that was authorized by the user to be shared and may also include information inferred by the computing server 130. Other examples of information stored in a user profile may include biographic, demographic, and other types of descriptive information such as work experience, educational history, gender, hobbies, or preferences, location and the like. In some embodiments, the user profile data may also include one or more photos of the users and photos of relatives (e.g., ancestors) of the users that are uploaded by the users. A user may authorize the computing server 130 to analyze one or more photos to extract information, such as the user's or relative's appearance traits (e.g., blue eyes, curved hair, etc.), from the photos. The appearance traits and other information extracted from the photos may also be saved in the profile store. In some cases, the computing server may allow users to upload many different photos of the users, their relatives, and even friends. User profile data may also be obtained from other suitable sources, including historical records (e.g., records related to an ancestor), medical records, military records, photographs, other records indicating one or more traits, and other suitable recorded data.

For example, the computing server 130 may present various survey questions to its users from time to time. The responses to the survey questions may be stored at individual profile store 210. The survey questions may be related to various aspects of the users and the users' families. Some survey questions may be related to users' phenotypes, while other questions may be related to environmental factors of the users.

Survey questions may concern health or disease-related phenotypes, such as questions related to the presence or absence of genetic diseases or disorders, inheritable diseases or disorders, or other common diseases or disorders that have a family history as one of the risk factors, questions regarding any diagnosis of increased risk of any diseases or disorders, and questions concerning wellness-related issues such as a family history of obesity, family history of causes of death, etc. The diseases identified by the survey questions may be related to single-gene diseases or disorders that are caused by a single-nucleotide variant, an insertion, or a deletion. The diseases identified by the survey questions may also be multifactorial inheritance disorders that may be caused by a combination of environmental factors and genes. Examples of multifactorial inheritance disorders may include heart disease, Alzheimer's disease, diabetes, cancer, and obesity. The computing server 130 may obtain data on a user's disease-related phenotypes from survey questions about the health history of the user and her family and also from health records uploaded by the user.

Survey questions also may be related to other types of phenotypes such as appearance traits of the users. A survey regarding appearance traits and characteristics may include questions related to eye color, iris pattern, freckles, chin types, finger length, dimple chin, earlobe types, hair color, hair curl, skin pigmentation, susceptibility to skin burn, bitter taste, male baldness, baldness pattern, presence of unibrow, presence of wisdom teeth, height, and weight. A survey regarding other traits also may include questions related to users' taste and smell such as the ability to taste bitterness, asparagus smell, cilantro aversion, etc. A survey regarding traits may further include questions related to users' body conditions such as lactose tolerance, caffeine consumption, malaria resistance, norovirus resistance, muscle performance, alcohol flush, etc. Other survey questions regarding a person's physiological or psychological traits may include vitamin traits and sensory traits such as the ability to sense an asparagus metabolite. Traits may also be collected from historical records, electronic health records and electronic medical records.

The computing server 130 also may present various survey questions related to the environmental factors of users. In this context, an environmental factor may be a factor that is not directly connected to the genetics of the users. Environmental factors may include users' preferences, habits, and lifestyles. For example, a survey regarding users' preferences may include questions related to things and activities that users like or dislike, such as types of music a user enjoys, dancing preference, party-going preference, certain sports that a user plays, video game preferences, etc. Other questions may be related to the users' diet preferences such as like or dislike a certain type of food (e.g., ice cream, egg). A survey related to habits and lifestyle may include questions regarding smoking habits, alcohol consumption and frequency, daily exercise duration, sleeping habits (e.g., morning person versus night person), sleeping cycles and problems, hobbies, and travel preferences. Additional environmental factors may include diet amount (calories, macronutrients), physical fitness abilities (e.g., stretching, flexibility, heart rate recovery), family type (adopted family or not, has siblings or not, lived with extended family during childhood), property and item ownership (has home or rents, has a smartphone or doesn't, has a car or doesn't).

Surveys also may be related to other environmental factors such as geographical, social-economic, or cultural factors. Geographical questions may include questions related to the birth location, family migration history, town, or city of users' current or past residence. Social-economic questions may be related to users' education level, income, occupations, self-identified demographic groups, etc. Questions related to culture may concern users' native language, language spoken at home, customs, dietary practices, etc. Other questions related to users' cultural and behavioral questions are also possible.

For any survey questions asked, the computing server 130 may also ask an individual the same or similar questions regarding the traits and environmental factors of the ancestors, family members, other relatives or friends of the individual. For example, a user may be asked about the native language of the user and the native languages of the user's parents and grandparents. A user may also be asked about the health history of his or her family members.

In addition to storing the survey data in the individual profile store 210, the computing server 130 may store some responses that correspond to data related to genealogical and genetics respectively to genealogy data store 200 and genetic data store 205.

The user profile data, photos of users, survey response data, the genetic data, and the genealogy data may be subject to the privacy and authorization setting of the users to specify any data related to the users that can be accessed, stored, obtained, or otherwise used. For example, when presented with a survey question, a user may select to answer or skip the question. The computing server 130 may present users from time-to-time information regarding users' selection of the extent of information and data shared. The computing server 130 also may maintain and enforce one or more privacy settings for users in connection with the access of the user profile data, photos, genetic data, and other sensitive data. For example, the user may pre-authorize the access to the data and may change the setting as wished. The privacy settings also may allow a user to specify (e.g., by opting out, by not opting in) whether the computing server 130 may receive, collect, log, or store particular data associated with the user for any purpose. A user may restrict her data at various levels. For example, on one level, the data may not be accessed by the computing server 130 for purposes other than displaying the data in the user's own profile. On another level, the user may authorize anonymization of her data and participate in studies and researches conducted by the computing server 130 such as a large-scale genetic study. On yet another level, the user may turn some portions of her genealogy data public to allow the user to be discovered by other users (e.g., potential relatives) and be connected to one or more family trees. Access or sharing of any information or data in the computing server 130 may also be subject to one or more similar privacy policies. A user's data and content objects in the computing server 130 may also be associated with different levels of restriction. The computing server 130 may also provide various notification features to inform and remind users of their privacy and access settings. For example, when privacy settings for a data entry allow a particular user or other entities to access the data, the data may be described as being "visible," "public," or other suitable labels, contrary to a "private" label.

In some cases, the computing server 130 may have a heightened privacy protection on certain types of data and data related to certain vulnerable groups. In some cases, the heightened privacy settings may strictly prohibit the use, analysis, and sharing of data related to a certain vulnerable group. In other cases, the heightened privacy settings may specify that data subject to those settings require prior approval for access, publication, or other use. In some cases, the computing server 130 may provide the heightened privacy as a default setting for certain types of data, such as genetic data or any data that the user marks as sensitive. The user may opt in to sharing of those data or change the default privacy settings. In other cases, the heightened privacy settings may apply across the board for all data of certain groups of users. For example, if computing server 130 determines that the user is a minor or has recognized that a picture of a minor is uploaded, the computing server 130 may designate all profile data associated with the minor as sensitive. In those cases, the computing server 130 may have one or more extra steps in seeking and confirming any sharing or use of the sensitive data.

The sample pre-processing engine 215 receives and pre-processes data received from various sources to change the data into a format used by the computing server 130. For genealogy data, the sample pre-processing engine 215 may receive data from an individual via the user interface 115 of the client device 110. To collect the user data (e.g., genealogical and survey data), the computing server 130 may cause an interactive user interface on the client device 110 to display interface elements in which users can provide genealogy data and survey data. Additional data may be obtained from scans of public records. The data may be manually provided or automatically extracted via, for example, optical character recognition (OCR) performed on census records, town or government records, or any other item of printed or online material. Some records may be obtained by digitalizing written records such as older census records, birth certificates, death certificates, etc.

The sample pre-processing engine 215 may also receive raw data from genetic data extraction service server 125. The genetic data extraction service server 125 may perform laboratory analysis of biological samples of users and generate sequencing results in the form of digital data. The sample pre-processing engine 215 may receive the raw genetic datasets from the genetic data extraction service server 125. Most of the mutations that are passed down to descendants are related to single-nucleotide polymorphism (SNP). SNP is a substitution of a single nucleotide that occurs at a specific position in the genome. The sample pre-processing engine 215 may convert the raw base pair sequence into a sequence of genotypes of target SNP sites. Alternatively, the pre-processing of this conversion may be performed by the genetic data extraction service server 125. The sample pre-processing engine 215 identifies autosomal SNPs in an individual's genetic dataset. In some embodiments, the SNPs may be autosomal SNPs. In some embodiments, 700,000 SNPs may be identified in an individual's data and may be stored in genetic data store 205. Alternatively, in some embodiments, a genetic dataset may include at least 10,000 SNP sites. In another embodiment, a genetic dataset may include at least 100,000 SNP sites. In yet another embodiment, a genetic dataset may include at least 300,000 SNP sites. In yet another embodiment, a genetic dataset may include at least 1,000,000 SNP sites. The sample pre-processing engine 215 may also convert the nucleotides into bits. The identified SNPs, in bits or in other suitable formats, may be provided to the phasing engine 220 which phases the individual's diploid genotypes to generate a pair of haplotypes for each user.

The phasing engine 220 phases diploid genetic dataset into a pair of haploid genetic datasets and may perform imputation of SNP values at certain sites whose alleles are missing. An individual's haplotype may refer to a collection of alleles (e.g., a sequence of alleles) that are inherited from a parent.

Phasing may include a process of determining the assignment of alleles (particularly heterozygous alleles) to chromosomes. Owing to sequencing conditions and other constraints, a sequencing result often includes data regarding a pair of alleles at a given SNP locus of a pair of chromosomes but may not be able to distinguish which allele belongs to which specific chromosome. The phasing engine 220 uses a genotype phasing algorithm to assign one allele to a first chromosome and another allele to another chromosome. The genotype phasing algorithm may be developed based on an assumption of linkage disequilibrium (LD), which states that haplotype in the form of a sequence of alleles tends to cluster together. The phasing engine 220 is configured to generate phased sequences that are also commonly observed in many other samples. Put differently, haplotype sequences of different individuals tend to cluster together. A haplotype-cluster model may be generated to determine the probability distribution of a haplotype that includes a sequence of alleles. The haplotype-cluster model may be trained based on labeled data that includes known phased haplotypes from a trio (parents and a child). A trio is used as a training sample because the correct phasing of the child is almost certain by comparing the child's genotypes to the parent's genetic datasets. The haplotype-cluster model may be generated iteratively along with the phasing process with a large number of unphased genotype datasets. The haplotype-cluster model may also be used to impute one or more missing data.

By way of example, the phasing engine 220 may use a directed acyclic graph model such as a hidden Markov model (HMM) to perform the phasing of a target genotype dataset. The directed acyclic graph may include multiple levels, each level having multiple nodes representing different possibilities of haplotype clusters. An emission probability of a node, which may represent the probability of having a particular haplotype cluster given an observation of the genotypes may be determined based on the probability distribution of the haplotype-cluster model. A transition probability from one node to another may be initially assigned to a non-zero value and be adjusted as the directed acyclic graph model and the haplotype-cluster model are trained. Various paths are possible in traversing different levels of the directed acyclic graph model. The phasing engine 220 determines a statistically likely path, such as the most probable path or a probable path that is at least more likely than 95% of other possible paths, based on the transition probabilities and the emission probabilities. A suitable dynamic programming algorithm such as the Viterbi algorithm may be used to determine the path. The determined path may represent the phasing result. U.S. Pat. No. 10,679,729, entitled "Haplotype Phasing Models," granted on Jun. 9, 2020, describes example embodiments of haplotype phasing. Other example phasing embodiments are described in U.S. Patent Application Publication No. US 2021/0034647, entitled "Clustering of Matched Segments to Determine Linkage of Dataset in a Database," published on Feb. 4, 2021.

The IBD estimation engine 225 estimates the amount of shared genetic segments between a pair of individuals based on phased genotype data (e.g., haplotype datasets) that are stored in the genetic data store 205. IBD segments may be segments identified in a pair of individuals that are putatively determined to be inherited from a common ancestor. The IBD estimation engine 225 retrieves a pair of haplotype datasets for each individual. The IBD estimation engine 225 may divide each haplotype dataset sequence into a plurality of windows. Each window may include a fixed number of SNP sites (e.g., about 100 SNP sites). The IBD estimation engine 225 identifies one or more seed windows in which the alleles at all SNP sites in at least one of the phased haplotypes between two individuals are identical. The IBD estimation engine 225 may expand the match from the seed windows to nearby windows until the matched windows reach the end of a chromosome or until a homozygous mismatch is found, which indicates the mismatch is not attributable to potential errors in phasing or imputation. The IBD estimation engine 225 determines the total length of matched segments, which may also be referred to as IBD segments. The length may be measured in the genetic distance in the unit of centimorgans (cM). A unit of centimorgan may be a genetic length. For example, two genomic positions that are one cM apart may have a 1% chance during each meiosis of experiencing a recombination event between the two positions. The computing server 130 may save data regarding individual pairs who share a length of IBD segments exceeding a predetermined threshold (e.g., 6 cM), in a suitable data store such as in the genealogy data store 200. U.S. Pat. No. 10,114,922, entitled "Identifying Ancestral Relationships Using a Continuous stream of Input," granted on Oct. 30, 2018, and U.S. Pat. No. 10,720,229, entitled "Reducing Error in Predicted Genetic Relationships," granted on Jul. 21, 2020, describe example embodiments of IBD estimation.

Typically, individuals who are closely related share a relatively large number of IBD segments, and the IBD segments tend to have longer lengths (individually or in aggregate across one or more chromosomes). In contrast, individuals who are more distantly related share relatively fewer IBD segments, and these segments tend to be shorter (individually or in aggregate across one or more chromosomes). For example, while close family members often share upwards of 71 cM of IBD (e.g., third cousins), more distantly related individuals may share less than 12 cM of IBD. The extent of relatedness in terms of IBD segments between two individuals may be referred to as IBD affinity. For example, the IBD affinity may be measured in terms of the length of IBD segments shared between two individuals.

Community assignment engine 230 assigns individuals to one or more genetic communities based on the genetic data of the individuals. A genetic community may correspond to an ethnic origin, or a group of people descended from a common ancestor. The granularity of genetic community classification may vary depending on embodiments and methods used to assign communities. For example, in some embodiments, the communities may be African, Asian, European, etc. In another embodiment, the European community may be divided into Irish, German, Swedes, etc. In yet another embodiment, the Irish may be further divided into Irish in Ireland, Irish immigrated to America in 1800, Irish immigrated to America in 1900, etc. The community classification may also depend on whether a population is admixed or unadmixed. For an admixed population, the classification may further be divided based on different ethnic origins in a geographical region.

Community assignment engine 230 may assign individuals to one or more genetic communities based on their genetic datasets using machine learning models trained by unsupervised learning or supervised learning. In an unsupervised approach, the community assignment engine 230 may generate data representing a partially connected undirected graph. In this approach, the community assignment engine 230 represents individuals as nodes. Some nodes are connected by edges whose weights are based on IBD affinity between two individuals represented by the nodes. For example, if the total length of two individuals' shared IBD segments does not exceed a predetermined threshold, the nodes are not connected. The edges connecting two nodes are associated with weights that are measured based on the IBD affinities. The undirected graph may be referred to as an IBD network. The community assignment engine 230 uses clustering techniques such as modularity measurement (e.g., the Louvain method) to classify nodes into different clusters in the IBD network. Each cluster may represent a community. The community assignment engine 230 may also determine sub-clusters, which represent sub-communities. The computing server 130 saves the data representing the IBD network and clusters in the IBD network data store 235. U.S. Pat. No. 10,223,498, entitled "Discovering Population Structure from Patterns of Identity-By-Descent," granted on Mar. 5, 2019, describes example embodiments of community detection and assignment.

The community assignment engine 230 may also assign communities using supervised techniques. For example, genetic datasets of known genetic communities (e.g., individuals with confirmed ethnic origins) may be used as training sets that have labels of the genetic communities. Supervised machine learning classifiers, such as logistic regressions, support vector machines, random forest classifiers, and neural networks may be trained using the training set with labels. A trained classifier may distinguish binary or multiple classes. For example, a binary classifier may be trained for each community of interest to determine whether a target individual's genetic dataset belongs or does not belong to the community of interest. A multi-class classifier such as a neural network may also be trained to determine whether the target individual's genetic dataset most likely belongs to one of several possible genetic communities.

Reference panel sample store 240 stores reference panel samples for different genetic communities. A reference panel sample is a genetic data of an individual whose genetic data is the most representative of a genetic community. The genetic data of individuals with the typical alleles of a genetic community may serve as reference panel samples. For example, some alleles of genes may be over-represented (e.g., being highly common) in a genetic community. Some genetic datasets include alleles that are commonly present among members of the community. Reference panel samples may be used to train various machine learning models in classifying whether a target genetic dataset belongs to a community, determining the ethnic composition of an individual, and determining the accuracy of any genetic data analysis, such as by computing a posterior probability of a classification result from a classifier.

A reference panel sample may be identified in different ways. In some embodiments, an unsupervised approach in community detection may apply the clustering algorithm recursively for each identified cluster until the sub-clusters contain a number of nodes that are smaller than a threshold (e.g., contains fewer than 1000 nodes). For example, the community assignment engine 230 may construct a full IBD network that includes a set of individuals represented by nodes and generate communities using clustering techniques. The community assignment engine 230 may randomly sample a subset of nodes to generate a sampled IBD network. The community assignment engine 230 may recursively apply clustering techniques to generate communities in the sampled IBD network. The sampling and clustering may be repeated for different randomly generated sampled IBD networks for various runs. Nodes that are consistently assigned to the same genetic community when sampled in various runs may be classified as a reference panel sample. The community assignment engine 230 may measure the consistency in terms of a predetermined threshold. For example, if a node is classified to the same community 95% (or another suitable threshold) of the times whenever the node is sampled, the genetic dataset corresponding to the individual represented by the node may be regarded as a reference panel sample. Additionally, or alternatively, the community assignment engine 230 may select N most consistently assigned nodes as a reference panel for the community.

Other ways to generate reference panel samples are also possible. For example, the computing server 130 may collect a set of samples and gradually filter and refine the samples until high-quality reference panel samples are selected. For example, a candidate reference panel sample may be selected from an individual whose recent ancestors are born at a certain birthplace. The computing server 130 may also draw sequence data from the Human Genome Diversity Project (HGDP). Various candidates may be manually screened based on their family trees, relatives' birth location, and other quality control. Principal component analysis may be used to create clusters of genetic data of the candidates. Each cluster may represent an ethnicity. The predictions of the ethnicity of those candidates may be compared to the ethnicity information provided by the candidates to perform further screening.

The ethnicity estimation engine 245 estimates the ethnicity composition of a genetic dataset of a target individual. The genetic datasets used by the ethnicity estimation engine 245 may be genotype datasets or haplotype datasets. For example, the ethnicity estimation engine 245 estimates the ancestral origins (e.g., ethnicity) based on the individual's genotypes or haplotypes at the SNP sites. To take a simple example of three ancestral populations corresponding to African, European and Native American, an admixed user may have nonzero estimated ethnicity proportions for all three ancestral populations, with an estimate such as [0.05, 0.65, 0.30], indicating that the user's genome is 5% attributable to African ancestry, 65% attributable to European ancestry and 30% attributable to Native American ancestry. The ethnicity estimation engine 245 generates the ethnic composition estimate and stores the estimated ethnicities in a data store of computing server 130 with a pointer in association with a particular user.

In some embodiments, the ethnicity estimation engine 245 divides a target genetic dataset into a plurality of windows (e.g., about 1000 windows). Each window includes a small number of SNPs (e.g., 300 SNPs). The ethnicity estimation engine 245 may use a directed acyclic graph model to determine the ethnic composition of the target genetic dataset. The directed acyclic graph may represent a trellis of an inter-window hidden Markov model (HMM). The graph includes a sequence of a plurality of node groups. Each node group, representing a window, includes a plurality of nodes. The nodes represent different possibilities of labels of genetic communities (e.g., ethnicities) for the window. A node may be labeled with one or more ethnic labels. For example, a level includes a first node with a first label representing the likelihood that the window of SNP sites belongs to a first ethnicity and a second node with a second label representing the likelihood that the window of SNPs belongs to a second ethnicity. Each level includes multiple nodes so that there are many possible paths to traverse the directed acyclic graph.

The nodes and edges in the directed acyclic graph may be associated with different emission probabilities and transition probabilities. An emission probability associated with a node represents the likelihood that the window belongs to the ethnicity labeling the node given the observation of SNPs in the window. The ethnicity estimation engine 245 determines the emission probabilities by comparing SNPs in the window corresponding to the target genetic dataset to corresponding SNPs in the windows in various reference panel samples of different genetic communities stored in the reference panel sample store 240. The transition probability between two nodes represents the likelihood of transition from one node to another across two levels. The ethnicity estimation engine 245 determines a statistically likely path, such as the most probable path or a probable path that is at least more likely than 95% of other possible paths, based on the transition probabilities and the emission probabilities. A suitable dynamic programming algorithm such as the Viterbi algorithm or the forward-backward algorithm may be used to determine the path. After the path is determined, the ethnicity estimation engine 245 determines the ethnic composition of the target genetic dataset by determining the label compositions of the nodes that are included in the determined path. U.S. Pat. No. 10,558,930, entitled "Local Genetic Ethnicity Determination System," granted on Feb. 11, 2020, and U.S. Pat. No. 10,692,587, granted on Jun. 23, 2020, entitled "Global Ancestry Determination System" describe different example embodiments of ethnicity estimation.

The front-end interface 250 displays various results determined by the computing server 130. The results and data may include the IBD affinity between a user and another individual, the community assignment of the user, the ethnicity estimation of the user, phenotype prediction and evaluation, genealogy data search, family tree and pedigree, relative profile and other information. The front-end interface 250 may allow users to manage their profile and data trees (e.g., family trees). The users may view various public family trees stored in the computing server 130 and search for individuals and their genealogy data via the front-end interface 250. The computing server 130 may suggest or allow the user to manually review and select potentially related individuals (e.g., relatives, ancestors, close family members) to add to the user's data tree. The front-end interface 250 may be a graphical user interface (GUI) that displays various information and graphical elements. The front-end interface 250 may take different forms. In one case, the front-end interface 250 may be a software application that can be displayed on an electronic device such as a computer or a smartphone. The software application may be developed by the entity controlling the computing server 130 and be downloaded and installed on the client device 110. In another case, the front-end interface 250 may take the form of a webpage interface of the computing server 130 that allows users to access their family tree and genetic analysis results through web browsers. In yet another case, the front-end interface 250 may provide an application program interface (API).

The tree management engine 260 performs computations and other processes related to users' management of their data trees such as family trees. The tree management engine 260 may allow a user to build a data tree from scratch or to link the user to existing data trees. In some embodiments, the tree management engine 260 may suggest a connection between a target individual and a family tree that exists in the family tree database by identifying potential family trees for the target individual and identifying one or more most probable positions in a potential family tree. A user (target individual) may wish to identify family trees to which he or she may potentially belong. Linking a user to a family tree or building a family may be performed automatically, manually, or using techniques with a combination of both. In an embodiment of an automatic tree matching, the tree management engine 260 may receive a genetic dataset from the target individual as input and search related individuals that are IBD-related to the target individual. The tree management engine 260 may identify common ancestors. Each common ancestor may be common to the target individual and one of the related individuals. The tree management engine 260 may in turn output potential family trees to which the target individual may belong by retrieving family trees that include a common ancestor and an individual who is IBD-related to the target individual. The tree management engine 260 may further identify one or more probable positions in one of the potential family trees based on information associated with matched genetic data between the target individual and those in the potential family trees through one or more machine learning models or other heuristic algorithms. For example, the tree management engine 260 may try putting the target individual in various possible locations in the family tree and determine the highest probability position(s) based on the genetic dataset of the target individual and genetic datasets available for others in the family tree and based on genealogy data available to the tree management engine 260. The tree management engine 260 may provide one or more family trees from which the target individual may select. For a suggested family tree, the tree management engine 260 may also provide information on how the target individual is related to other individuals in the tree. In a manual tree building, a user may browse through public family trees and public individual entries in the genealogy data store 200 and individual profile store 210 to look for potential relatives that can be added to the user's family tree. The tree management engine 260 may automatically search, rank, and suggest individuals for the user conduct manual reviews as the user makes progress in the front-end interface 250 in building the family tree.

As used herein, "pedigree" and "family tree" may be interchangeable and may refer to a family tree chart or pedigree chart that shows, diagrammatically, family information, such as family history information, including parentage, offspring, spouses, siblings, or otherwise for any suitable number of generations and/or people, and/or data pertaining to persons represented in the chart. U.S. Pat. No. 11,429,615, entitled "Linking Individual Datasets to a Database," granted on Aug. 30, 2022, describes example embodiments of how an individual may be linked to existing family trees.

Example Historical Map Rendering Process

Embodiments of systems and methods for transforming and navigating digitalized historical map images address shortcomings in the art by providing a novel and transformative approach to receiving and/or identifying a digitalized historical map image; providing and/or accessing an index that includes the digitalized historical map image metadata; transforming the identified digitalized historical map image by extracting, defining, and/or providing e.g., shape data, georeferenced data, and/or city, state, and county data; and navigating the digitalized historical map image. As described herein, a historical map image may refer to a digitalized image of a physical historical map image scanned and uploaded to or stored in a computer-readable storage medium. For example, physical historical maps may be maps used in a census record or another genealogy record. The historical map images may be saved in the genealogy data store 200 as part of genealogy records. Accordingly, the terms "digitalized historical map images" and "historical map images" may be used interchangeably. Navigating the digitalized historical map image includes, in some embodiments, aligning the digitalized historical map image and associated shape data, georeferenced data, and/or city, state, and county data to a digital map interface that includes a modern map image using, in some embodiments, a modern map API.

Figure 3:
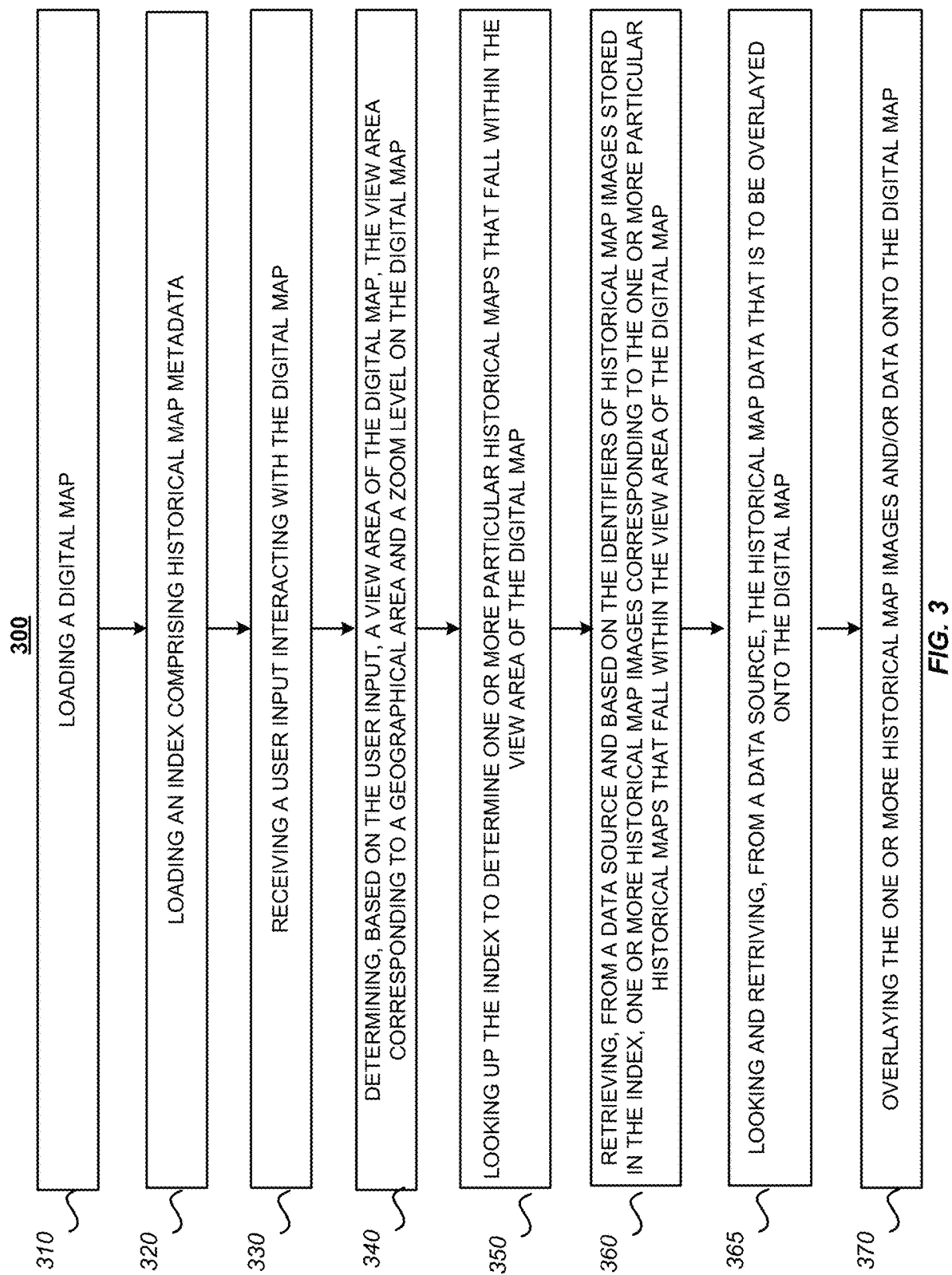
FIG. 3 is a flowchart depicting a method for receiving, transforming, and navigating historical map images, particularly in cooperation with modern map images, in accordance with some embodiments.

FIG. 3 is a flowchart depicting an example process 300 for displaying an inquiry geographical location on a digital map comprising modern map images overlaid with digitalized historical map images, in accordance with some embodiments. The process may be performed by a computing device that operates a map interface, which may be a web browser, a mobile application that renders maps, or another suitable application. The process 300 may be embodied as a software algorithm that may be stored as computer instructions that are executable by one or more processors. The instructions, when executed by the processors, cause the processors to perform various steps in the process 300. In various embodiments, the process may include additional, fewer, or different steps. While various steps in process 300 may be discussed with the use of a computing device with a web browser that renders digital maps, each step may be performed by a different computing device.

In some embodiments, process 300 can include loading a digital map (step 310). The digital map may be a modern map that is provided by any suitable map provider. For example, the computing server 130 may cause the map interface operated at the client device 110 to initiate an API call to a map provider to render a digital map. Various common digital map servers may provide the API and digital map, such as GOOGLE MAP, MAPBOX, MAPILLARY, OPENSTREETMAP, APPLE MAP, etc. In some embodiments, the computing server 130 may also be a map provider that maintains its own map. The digital map may be loaded at the map interface of the client device 110. The digital map may be loaded at an initial stage that by default may be rendered at a certain location and zoom-level, such as the world view, the user's current location, a default address, etc. The digital map loaded by an API may include basic information but can be visually customized on the layout and additional data as described in the rest of the steps in the process 300.

Continuing with reference to FIG. 3, in some embodiments, process 300 can include loading an index that includes historical map metadata (step 320). The computing server 130 may maintain a large number of digitalized images of historical physical maps. For example, each U.S. census may include physical maps of various enumeration districts and a census may include hundreds of thousands of those districts. The computing server 130 may maintain digitalized images of those enumeration district maps for various censuses, such as the U.S. 1940 Census, U.S. 1950 Census, U.S. 1960 Census, etc. While enumeration district maps from U.S. censuses are described, it will be appreciated that any suitable historical map or image from any context is likewise contemplated. The map interface of the client device 110 may load the index of the historical map images. The index provides data for the map interface to quickly look up historical map images to be loaded as a user navigates the map interface. For example, the index may include boundary coordinates (e.g., in longitude and latitude, or another map coordinate system) of the historical maps.

In some embodiments, the method further comprises looking up and retrieving historical map metadata that is to be overlayed onto the digital map in the user's current view area.

The index may also be referred to as a master metadata file that includes various metadata associated with historical map images, such as boundary coordinates of historical maps, shape information of the map, and identifiers of historical map images. The identifiers of the historical map images may correspond to the storage locations of the map images to allow the map interface to quickly download the map images. A master metadata file may also be referred to as a master metadata shape file. The master metadata file may be in any suitable format. For example, in some embodiments, the master metadata file may be in the format of nested key-value pair.

In some embodiments, the map interface may also load additional metadata files such as a georeferenced shape polygon file. The georeferenced shape polygon file may include coordinates of polygons that correspond to districts in the historical maps. The map interface may also load a centroid file. The centroid file may include data regarding centroids of the historical maps so that statistics of the historical maps may be determined based on the centroid map. In various embodiments, one or more additional files maybe loaded. Whether those files are combined with the master metadata file or are separate files may depend on the specification of the digital map API and how to be comparable to the digital map API.

Continuing with reference to FIG. 3, in some embodiments, process 300 can include receiving a user input interacting with the digital map (step 330). The user input may specify how the map should be navigated from a first view (or from another product page outside of the map) to a second view. The first view may be an initial default view of the map or another view as the user navigates the map. The second view may correspond to a specific location and/or zoom level that is rendered based on the user input. The user inputs may take various suitable forms. For example, the map interface may include a query box for a user to input information. The user may search for a geographical address, a zip code, an enumeration district identifier, a location name, or otherwise a search phrase that is supported by the computing server 130 that operates the map interface.

In some embodiments, a user input may also be a user manual selection of a location and zoom level. For example, the user may manually move the map and scroll in or out to adjust the zoom level. In some embodiments, a user may be using a feature provided by the computing server 130, such as a family tree builder, a genealogy record viewer, or a profile viewer, and the user selects a record or datum that is associated with a particular location. The selection may bring the user directly to the map interface that, in embodiments, will automatically move and zoom to the particular location. For example, the user may be browsing a historical person's profile stored in the genealogy data store 200 and the user may select "inspect birth location" of the historical person. In response, the computing server 130 causes the user interface 115 of the client device 110 to launch the map interface and brings the digital map to the birth location at the appropriate zoom level. This may be performed in any suitable view; e.g., with the map interface showing the modern map view only, the historical map view only, or a suitable blend, as discussed herein, of both map views.

In the map interface, various user interactions may be enabled, such as click events, hover events, highlighting, mouseenter, mousemove, mouseleave, click, etc. The index provides for the retrieval of metadata information upon the detection of pertinent user interaction.

Continuing with reference to FIG. 3, in some embodiments, process 300 can include determining, based on the user input, a view area of the digital map (step 340). The view area may correspond to a geographical area or location and a zoom level on the digital map. The geographical area and the zoom level may be determined based on the user input. For example, the user may input an address or a district identifier. In response, the map interface or the computing server 130 may search for the map location and select the appropriate zoom level based on the user input. The appropriate zoom level may be based on a predetermined threshold, such as a distance, for example, a one-mile radius, a five-mile radius, a 10-mile radius, or otherwise as suitable. Other zoom levels may be contemplated and may be used as suitable for a particular geographical area or location. For example, a particular zoom level of a one-mile radius may be used in a dense urban environment such as Manhattan, one of the boroughs of New York City, whereas a larger zoom level of 10 miles may be used in less densely populated areas.

Continuing with reference to FIG. 3, in some embodiments, process 300 can include looking up the index to determine one or more particular historical maps that fall within the view area of the digital map (step 350). Looking up the index may include examining whether the boundary coordinates of the historical maps fall at least partially within the geographical area corresponding to the view area at the zoom level. For example, the computing server 130 may maintain a large number of historical maps each of which may be considered as roughly a rectangle that may be orientated in different degrees or directions. The corners of a historical map may define the boundary of the historical map. The geographical coordinates of the corners of various historical maps may be stored in the index file. After the current view area is fixed, the map interface may look up the index to determine which historical maps at least partially fall within the view area. Optionally, the map interface may look up and retrieve, from a data source, historical map data that fall within the view area.

Continuing with reference to FIG. 3, in some embodiments, process 300 can include retrieving, from a data source and based on the identifiers of historical map images stored in the index, one or more historical map images corresponding to the one or more particular historical maps that fall within the view area of the digital map (step 360). For example, using the index, the map interface may retrieve identifiers for those historical maps that at least partially fall within the view area. In turn, the map interface may download the images of the historical maps using the identifiers from a data source. The data source may be the genealogy data store 200 or another suitable data source.

Continuing with reference to FIG. 3, in some embodiments, process 300 can include looking up and retrieving, from a data source, the historical map data (e.g., enumeration district polygon) that is to be overlayed onto the digital map in the user's current view area (step 365). In some embodiments, the map interface looks up and retrieves one or more enumeration district polygons that fall within the view area. This data may be used to determine the enumeration district that is being hovered over or clicked on in the digital map view.

Continuing with reference to FIG. 3, in some embodiments, process 300 can include overlaying the one or more historical map images onto the digital map (step 370). The map interface may provide a control element to adjust the transparency of the digital map and/or the historical map images. For example, on one end, the historical map images may become completely opaque and cover the underlying digital map. On the other end, the historical map images may become completely transparent so that only the digital map is displayed. This may be a scale, such as a sliding scale or toggle, so that a user may adjust how visible the historical map images are. The overlaying may be based on the geographical coordinates of the historical map to determine the location and orientation of each historical map image. In some embodiments, districts within a historical map may also be displayed. For example, a historical map may include several districts that are in different shapes, such as being rectangular, triangular, regular or otherwise. The map interface may display the boundary of each historical district.

After the historical map images and/or historical districts are displayed and adjusted as desired, the user may further interface with the map interface and allow or direct the interface to launch additional features that are provided by the computing server 130. For example, the user may select a historical district and, in response, the map interface contacts the computing server 130. The user interface 115 in turn launches a browser of genealogy records that are related to the selected historical district. For example, the genealogy record browser may list every individual in a Census record that lives or lived in the historical district. In some embodiments, the user may also select a set of historical districts and the browser of genealogy records may collect individuals' records in those selected districts. Various other features that are related to family trees, DNA results, and/or genealogy records may also be provided.

The step 340 through step 370 may be repeated as the user continues to provide input to the map interface and navigate the map interface.

The process 300 allows users to visualize geographical information in the context of historical information. By way of example, in some embodiments, a user may search for a particular individual, such as an ancestor, and given information in a genealogical research database in which one or more indexed historical records are stored, a location corresponding to the ancestor may be retrieved. The map interface may then automatically navigate to the retrieved location and retrieve a corresponding historical map showing the location at a time pertinent to the ancestor. For example, a U.S. 1950 Census record may be indexed using handwriting recognition modalities to identify a particular ancestor and an associated address. The address may be used to automatedly navigate the map interface and the user to the associated address, with a historical map thereof loaded for viewing vis-à-vis a modern map image or interface by a user. Other records, such as birth, marriage, death, newspaper, or other records pertinent to the ancestor and/or the associated location, may likewise be retrieved or provided for the user to navigate to as part of their search and experience. In some embodiments, the pertinent historical record, such as a Census document, may be displayed in an interactive viewer.

By providing a system, method, and/or computer-program product for transforming and navigating historical map images, the problem of existing historical map images being difficult to identify, retrieve, and navigate especially vis-à-vis modern locations, is advantageously addressed. Historical map images may be advantageously retrieved, searched for, transformed, and navigated such that a historical address or other location may be compared against a corresponding modern location through a map interface, with corresponding records, historical districts, and other pertinent information retrieved, presented, and transformed as well.

Example Graphical User Interface Display Map Elements

Figure 4:
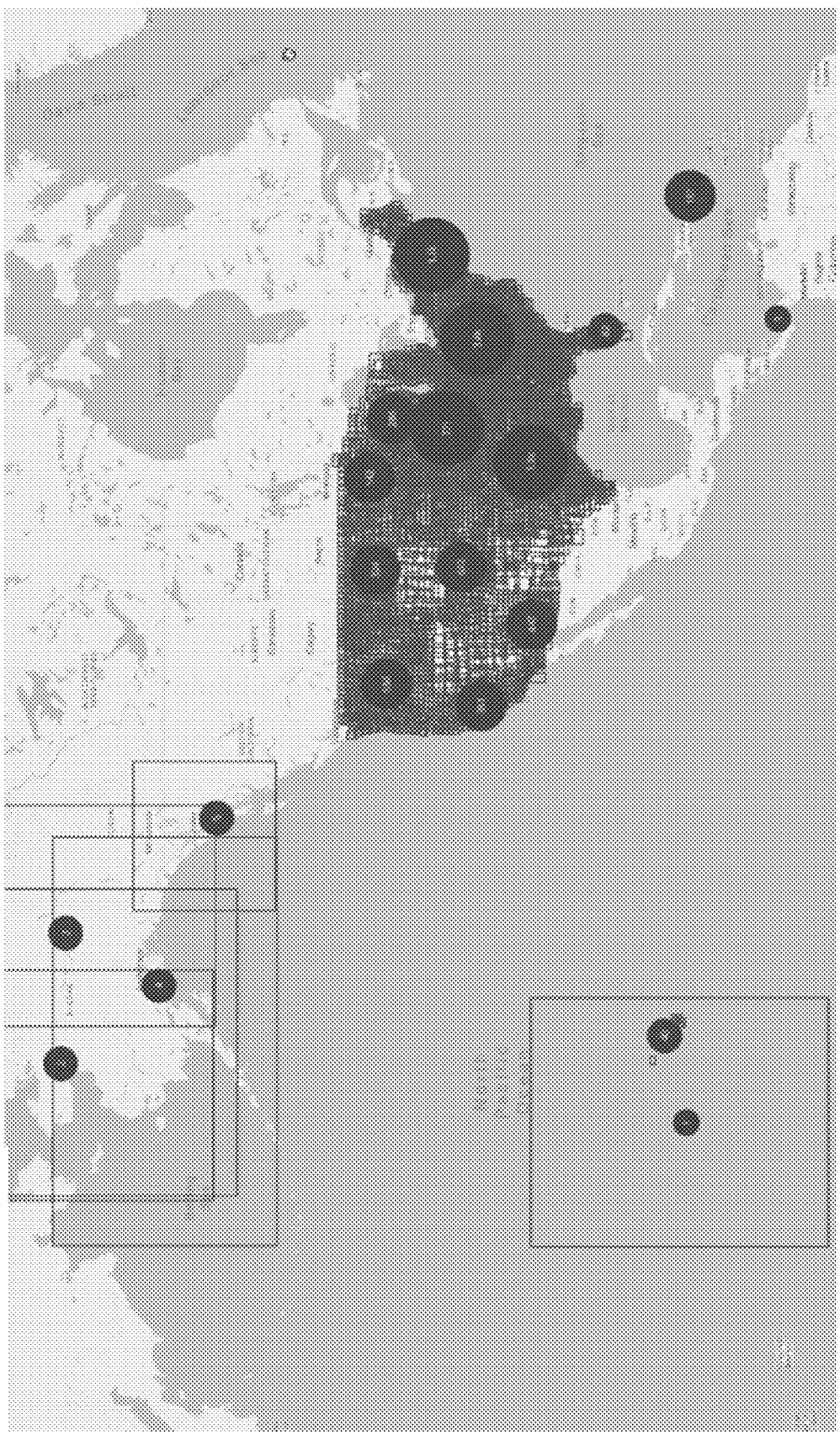
FIG. 4 illustrates exemplary representation of a United States master metadata shape file/vector tileset, in accordance with some embodiments.

FIG. 4 shows the representation of an example map interface with a view 400 that roughly displays various boundaries of historical maps that may be rendered, in accordance with some embodiments. This particular example may include only the United States master metadata shape file and vector tilesets. The view 400 may correspond to a stage where the map interface has loaded the digital map and one or more metadata files such as the index. The view 400 may represent a default or initial view of the map interface, according to some embodiments. Since the index file has been loaded as the boundaries of the historical maps are provided to the map interface, the map interface may represent each historical map as a rectangle that is best seen in the Alaska and Hawaii areas. Since the continental United States is associated with a large number of historical maps, the rectangles in the continental United States are very crowded in this view and zoom level. In some embodiments, the map interface may also load a centroid metadata file. The user interface may also generate a cluster view on the digital map. The cluster view may include statistics of a number of historical maps in an area based on the centroids of the historical maps. For example, the clusters show the number "40" in the Hawaii island area, indicating that there are 40 historical maps associated with that area. This advantageously allows a user to navigate during their research to areas where historical map images are most likely to be available for browsing.

The metadata and additional files used to customize a digital map may take various forms, depending on the source of the historical maps. In some embodiments, the digitalized historical map images may be derived from a Census record collection that includes one or more Census enumeration districts, e.g., U.S. 1950 Census enumeration district (ED) historical maps. In certain geographical areas, a Census ED may have roughly 9600 historical map images (e.g., a Manhattan, NY historical ED map) associated therewith.

From those historical maps, various types of files, such as metadata files, may be created and uploaded into a digital map as tilesets. By way of example, a georeferenced ED "historical map image" may be created for every U.S. 1950 Census ED historical map and stored in, e.g., GeoTIFF files. These GeoTIFF files may be uploaded to the digital map to create corresponding raster tilesets. Additionally, or alternatively, a georeferenced shape "polygon file" for every U.S. 1950 Census ED historical map may also be created and stored in GeoJSON or other files. Each GeoJSON file may have the polygons that include the enumeration districts from a particular U.S. 1950 Census ED map. Each polygon in this file has the following metadata properties including, but not limited to, enumeration identity (ED_ID), and identity of the ED map from whence the polygon is derived (Map_ID), which is uploaded to the digital map to create the corresponding vector tilesets.

Additionally, or alternatively, a master metadata shape file (which may also be referred to as the index) may be created to include every georeferenced U.S. 1950 Census ED map and their accompanying ED polygons generated from those maps. This may be accomplished by using the latitude/longitude bounds of the ED map. Each polygon has the following metadata properties, including: identity of ED raster tileset (map) that is within the polygon bounds (Map_ID), name of the ED map within the polygon bounds (Map_Title), ID of the vector tileset that denotes the enumeration districts found on the map referenced by this polygon (Poly_ID), state of map and associated ED polygons (State), county of map and associated ED polygons (County), and city of map and associated ED polygons (City). Additionally, or alternatively, a master centroid GeoJSON file for the centroids of the polygons in the master shape file is created. The GeoJSON file(s) may be used to create a clustering on the world map of the U.S. 1950 Census historical ED maps, showing densities of maps within the US. Other properties or combinations are also contemplated.

Transforming and Navigating Historical Map Images

Figure 5:
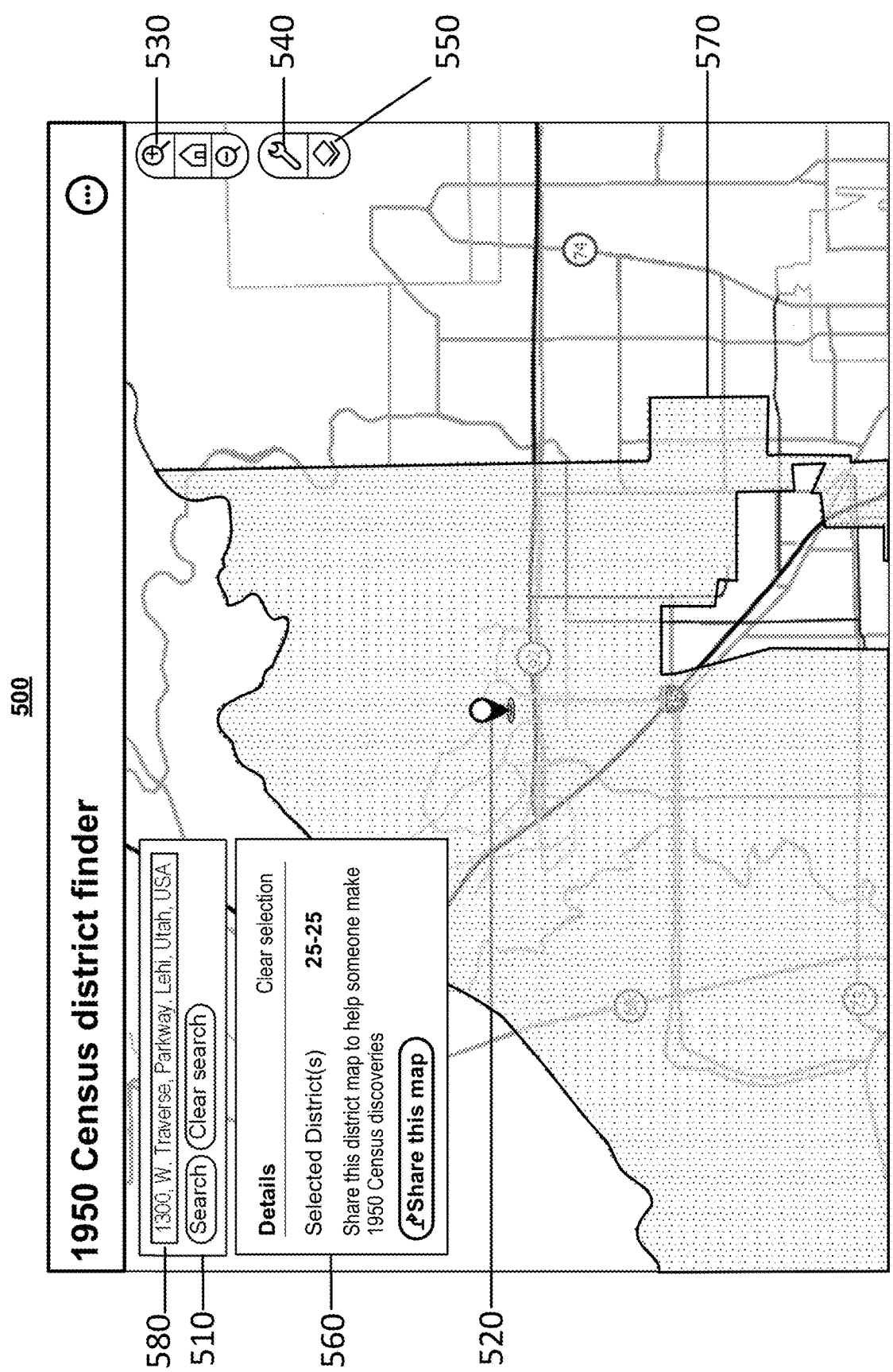
FIG. 5 illustrates an exemplary digital map interface including a modern map, a search interface, a details interface, and one or more interface tools, in accordance with some embodiments.

FIG. 5 is a conceptual diagram illustrating an example map interface (500) that provides a specific view area based on a user input, in accordance with some embodiments. The modern map API may be accessed and utilized in conjunction with one or more historical map images transformed and navigated according to the disclosed embodiments. The modern map API may be utilized as seen in FIG. 5 to search for a particular address, e.g., 1300 W Traverse Parkway, Lehi UT.

Figure 6:
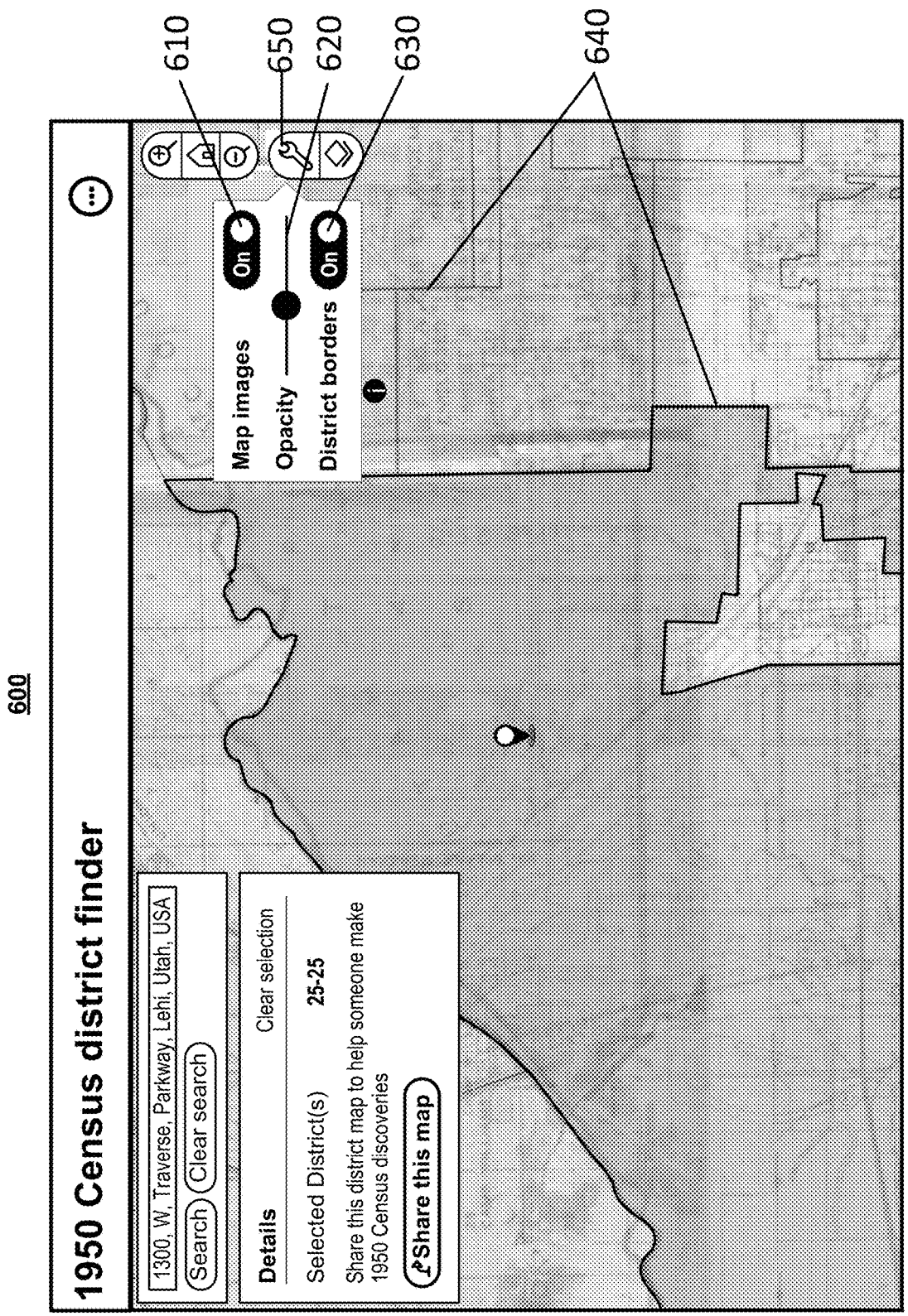
FIG. 6 illustrates an exemplary digital map interface aligned and overlaid with one or more digitalized historical map images, in accordance with some embodiments.
Figure 7:
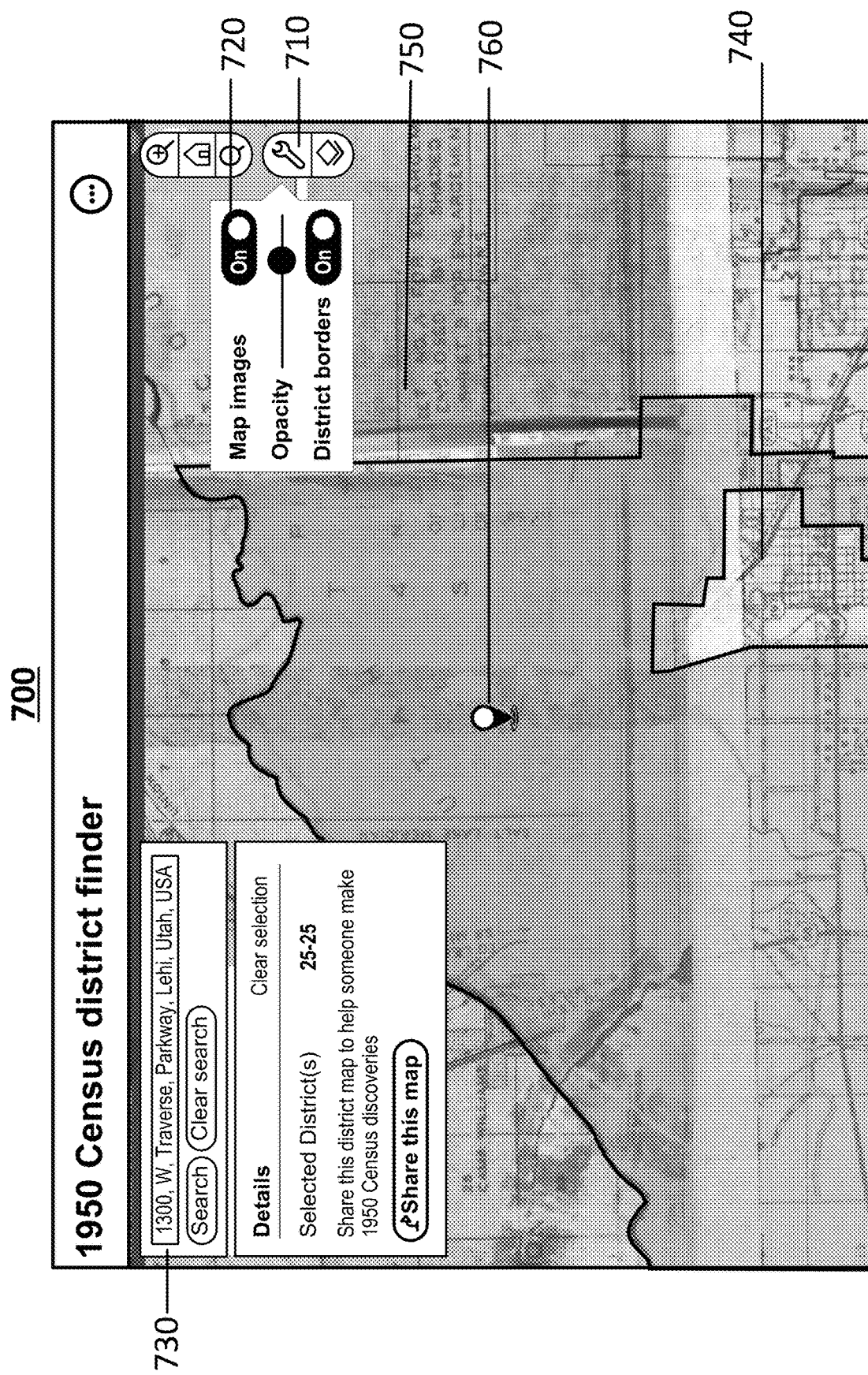
FIG. 7 illustrates an exemplary display of a precise location on a digital map interface aligned with one or more digitalized historical map images, in accordance with some embodiments.

As seen in FIG. 5, a modern map interface such as a digital map (500) includes a map, a search interface (510) wherein a user can input an address or other location, person of interest, or other search query, an icon (580) showing the searched-for address or search query within the modern map interface (as referred to as digital map) (500), an icon (560) showing the corresponding enumeration district (ED) identity (e.g., 25-25), a detailed interface indicating one or more historical map districts (570) within which the searched-for address falls, and one or more interface tools such as a tools icon (540). As shown in FIGS. 6 and 7, the tools icon (650) comprises in some embodiments an opacity toggle (620) allowing a user to adjust, along a spectrum, a transparency of the modern map interface (600) in relation to one or more aligned historical map images (640). That is, as the opacity toggle (620) is adjusted by a user, the transparency of the modern map (which may be the default image) is increased, showing in greater measure the aligned historical map image(s).

As seen in FIGS. 6 (600) and 7 (700), the modern map interface transparency is increased and the one or more aligned and overlaid historical map images are increasingly displayed. The interface includes in some embodiments a tool (710) for selecting map images from stacked images (720) which is a plurality of aligned and overlaid historical map images (750) to show the identified and retrieved historical map manages on the interactive digital map.

In some embodiments, one or more historical map districts may be Census Enumeration Districts. The Enumeration Districts may be from a predetermined Census, such as the U.S. 1950 Census. The map interface may be configured to highlight the historical map district in any suitable manner, such as by overlaying the bounds thereof over the modern map and highlighting the historical map district over the modern map interface.

The historical map images are overlaid by providing a specialized index comprising metadata and shape data for the historical map images. The historical map images may be accessed and processed to extract therefrom metadata and shape data comprising, e.g., georeferenced data for the historical map images as a whole and for each shape determined therewithin. The shapes within the historical map images may include, e.g., shapes approximating the boundaries of historical map districts such as Enumeration Districts. The shapes may be approximated in any suitable manner, including using manual methods, object-detection and segmentation modalities, combinations thereof, or otherwise.

The specialized index may comprise data for each of a plurality of historical map images. For the 1950 U.S. Census, for example, there may be 9600 historical map images outlining all or a plurality of the Enumeration Districts, which amount to approximately 180,000. The specialized index may include georeferenced data on the boundaries for each of the Enumeration Districts within the historical map images as well as georeferenced data for the historical map images as a whole. The georeferenced data may be accessed by a system or processor performing a method according to embodiments to overlay and align one or more historical map images onto a modern map interface. As seen in FIGS. 6 and 7, this advantageously allows the systems and methods of embodiments to automatedly scale, rotate, and otherwise transform a historical map image such that the features detailed therewithin align with the features of a modern map.

As a result, a user searching for an ancestor or other person of interest vis-à-vis a predetermined historical map, such as the 1950 U.S. Census, can enter a known address (730), and be directed to a precise location (760) both on the modern map interface (740) and on a pertinent historical map image (750), with an enriched understanding of where the ancestor or person of interest lived (and what their surroundings looked like) in the past, and what that location (760) looks like currently. The embodiments further allow a user to compare any historical map images with a corresponding location in a modern map. For example, the tool (710) may allow a user to select from different historical periods, e.g., historical map images corresponding to the 1910 Census versus historical map images corresponding to the 1950 Census, so as to appreciate the changes to and around a particular location over time. In embodiments, historical map images of a same location from different time periods may be overlaid together on a modern map interface, with the user able to select a desired transparency for each.

Figure 9:
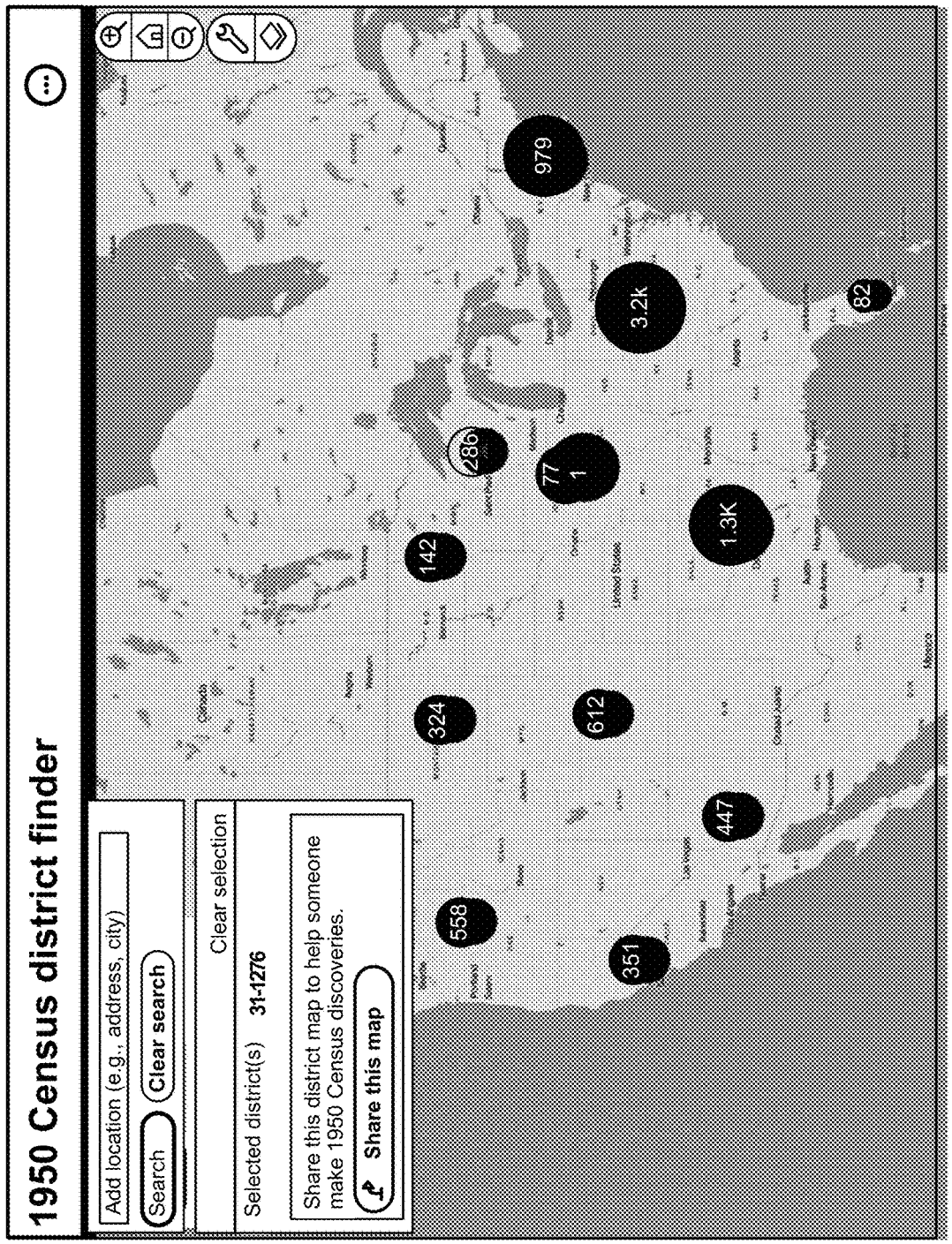
FIG. 9 illustrates exemplary clustering of digitalized historical map images displayed on a digital map interface, in accordance with some embodiments.

The map interface may further be configured to return one or more historical map districts based on a user hovering over a particular area of the map or clicking on a particular enumeration district or cluster of historical map images (FIG. 9).

The specialized index may further comprise a GeoJSON file comprising geographic bounds of historical map images along with metadata concerning the raster images and vector polygons that are within each polygon geoboundary. This file may be loaded into the Enumeration District map, e.g., the modern map interface, at an initial map load time but need not be made visible to a user. The shapes may be rendered in a transparent color.

With the GeoJSON file loaded from the specialized index, at any desired map interface zoom level, a map API may be queried for master polygon metadata rendered within the map's viewport, which, in turn, informs which raster and vector sources need to be loaded. The raster and vector sources may likewise be unloaded when no longer needed. This allows for the conservation of browser resources and reduced latency for improved user engagement and satisfaction. This may be performed at predetermined zoom levels and/or dynamically determined.

In some embodiments, minimum and maximum zoom levels may be determined according to which levels the metadata layer is created on the map, after which the map interface determines when the metadata is rendered. The zoom levels may determine when the data is available. In other embodiments, the metadata is always available by setting the minimum zoom level as low as possible, e.g., 0, and the maximum zoom level as high as possible, e.g., 24. The map interface may provide multiple events (e.g., "move end" and "idle") for querying the metadata.

That is, whereas hundreds of thousands of georeferenced shapes corresponding to Enumeration Districts may be provided with or accessed as part of a plurality of historical map images, by using the specialized index only a small number of these georeferenced shapes are rendered at any given time, thereby reducing memory requirements and performance resources required.

In some embodiments, individual shape sources for each corresponding historical map image are provided in the specialized index, which allows for each historical map image and corresponding components to be loaded/unloaded on demand, limiting the resource requirements of a user's computer, such as a mobile device, and/or the computing server 130. This also supports the ability to create a faster visual selection and hover user experience, as the number of shapes that need to be inspected by the map API is reduced from, e.g., hundreds of thousands to a few, dozens, or several hundred in densely populated areas like Manhattan.

The metadata in the specialized index may be provided in the form of tilesets. The specialized index may comprise a georeferenced historical map image, e.g., GeoTIFF, for each historical map image. In the 1950 U.S. Census, this corresponds to approximately 9600 distinct historical map images. These can be transformed into corresponding raster tilesets, in some embodiments by the modern map API.

The specialized index may further comprise a georeferenced shape polygon file (GeoJSON or another suitable format) for each historical map image. The georeferenced shape polygon file may comprise a plurality of shapes that correspond to or delineate historical districts of interest, e.g., Enumeration Districts. Each shape/polygon in the file may comprise one or more of a historical district name, area on the map, historical map image ID, etc. These may be utilized to create corresponding vector tilesets, in some embodiments by the modern map API.

The specialized index may further comprise a master metadata shape file that encompasses, using the latitude/longitude bounds, each historical map image and corresponding historical district shapes generated therefrom. The master metadata shape file may include a historical map image boundary, shown in FIG. 8A (800) as rectangles (810, 820, 830), showing the overall boundary of the historical map image determined, in some embodiments, to include all shapes of all historical districts therewithin. As seen, distinct historical map images may be rendered so as to be overlaid/overlapped to correspond to a modern map, using the metadata and georeferenced information extracted from and provided with the same in the specialized index.

This advantageously allows the map interface to determine when certain historical map image raster tilesets and corresponding historical district vector tilesets are in or out of view of the user, and, in turn, whether these should be displayed or removed. Each polygon in this file may comprise an ID of historical district raster tilesets, a map area which can be calculated at runtime as necessary, a name of the historical district within the polygon bounds, an ID of the vector tileset that denotes the historical districts within the pertinent historical map image, a state, county, and/or city associated with the historical map image, and/or any other suitable metadata.

Figure 8A:
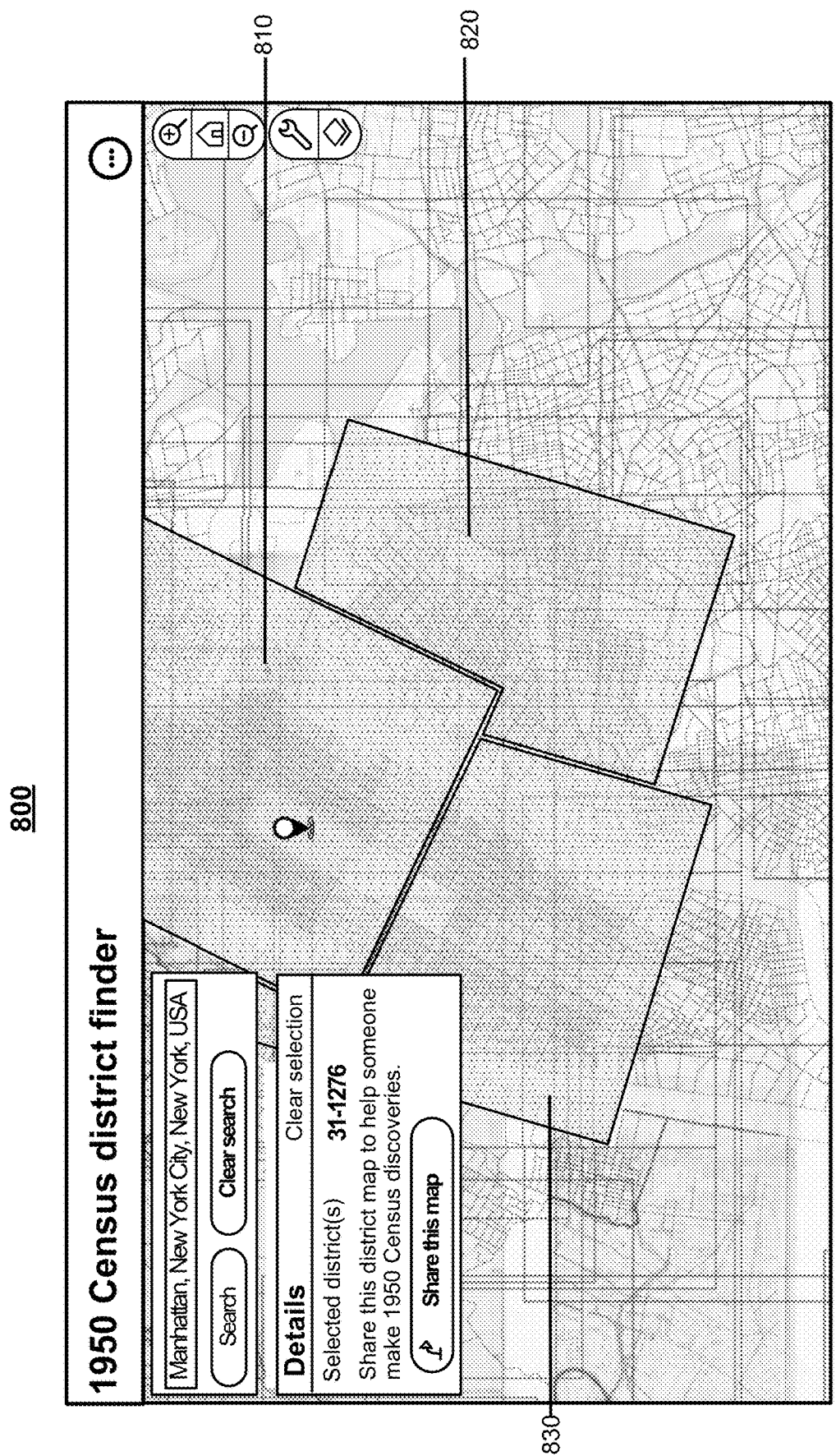
FIG. 8A illustrates exemplary multiple master metadata shape files each includes a digitalized historical map image boundary, in accordance with some embodiments.
Figure 8B:
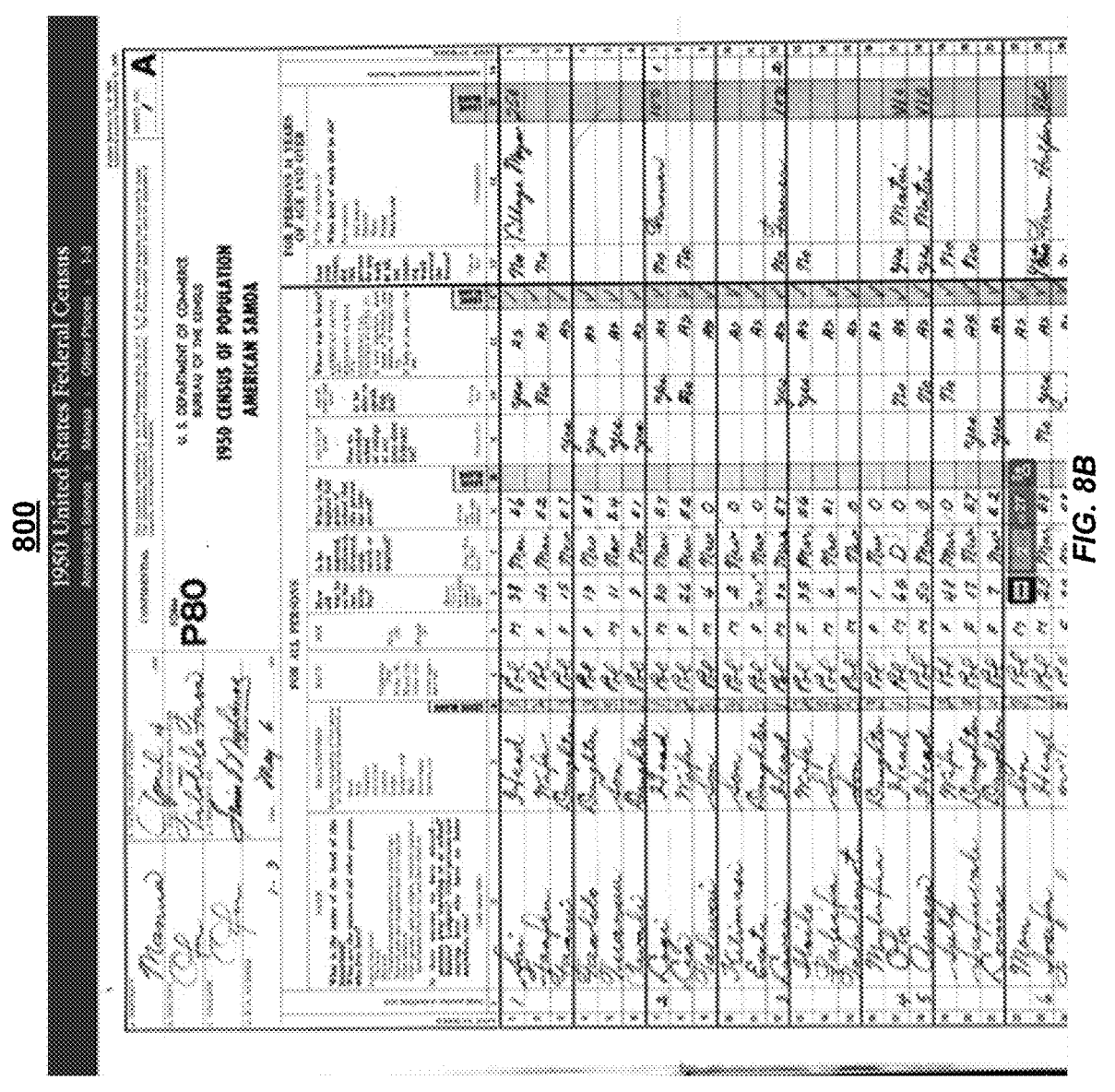

A user may select any historical districts, such as the enumeration districts of a census record, that are displayed on a digital map. For example, the historical districts may be displayed as polygons 810, 820, and 830 as shown in FIG. 8A. The user may select one or more historical districts. In turn, the user interface 115 may launch a genealogy browser that lists historical individuals that are associated with the selected historical districts, as shown in FIG. 8B (800). While a list, such as a Census document, is described, it will be appreciated that any suitable record type or resource may be similarly linked to or used in cooperation with any of the embodiments as described herein.

In some embodiments, the enumeration district (ED) map images have color-specific, hand-drawn boundaries for enumeration districts. For illustration, a digitized map image may show the overlayed map over a basemap found in a GIS (Geographic Information System) software. In some embodiments, one or more colors are used for different types of boundaries. In some embodiments, the enumeration district is drawn with an orange line. In some embodiments, an automated system is employed to created polygons. In some of these embodiments, reworking and/or quality checking are employed due to the color quality and similar colors of boundary lines. In some embodiments, the polygon boundaries are manually drawn on top of the digitized map. Digitization of polygons in a GIS may involve creating a new layer, clicking along vertices and curved boundary lines, and entering data for each completed polygon. In certain embodiments, discretion is used by the annotator to decide on enumeration district boundaries that differed between two or more overlapping maps. In some embodiments, discretion is used when the map images have georeferencing errors and a line or vertex of a polygon is likely to be misplaced in the incorrect geographic location. In some embodiments, instruction is given to allow no gaps between polygons. The hand-drawn layer of enumeration district polygons can be exported and shown on Mapbox.

The metadata may further comprise a master centroid GeoJSON file for centroids of shapes/polygons in the master metadata shape file, which allows for clustering on the map of historical districts and the determination and display of densities of maps within the US, for example. For example, clustering 910 displays a density of 979 historical map images. This is shown in FIG. 9.

Computing Machine Architecture

Figure 10:
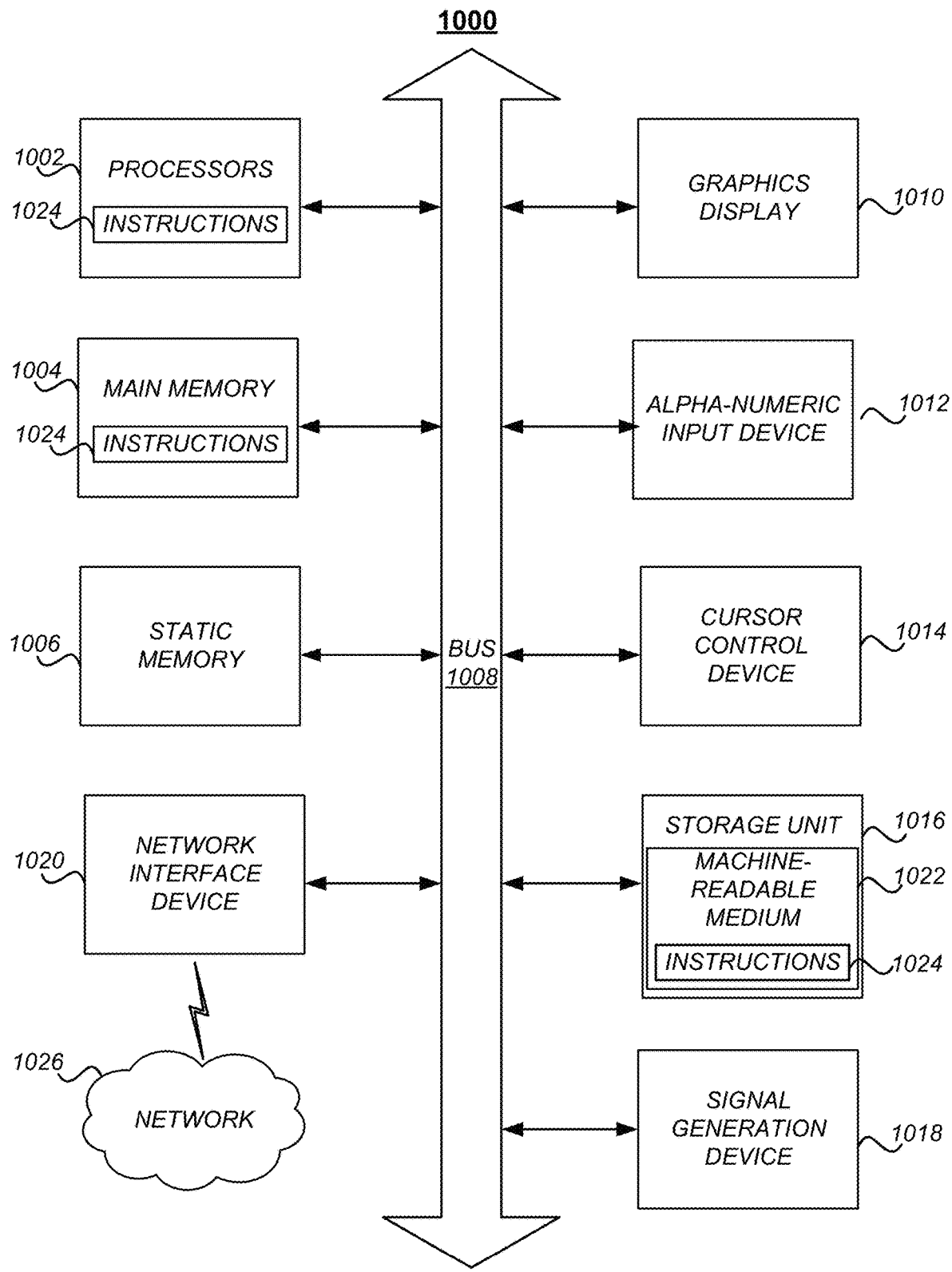
FIG. 10 is a block diagram of an example computing device, in accordance with some embodiments.

FIG. 10 is a block diagram illustrating components of an example computing machine (1000) that is capable of reading instructions from a computer-readable medium and execute them in a processor (or controller). A computer described herein may include a single computing machine shown in FIG. 10, a virtual machine, a distributed computing system that includes multiple nodes of computing machines shown in FIG. 10, or any other suitable arrangement of computing devices.

By way of example, FIG. 10 shows a diagrammatic representation of a computing machine in the example form of a computer system 1000 within which instructions 1024 (e.g., software, source code, program code, expanded code, object code, assembly code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 10 may correspond to any software, hardware, or combined components shown in FIGS. 1 and 2, including but not limited to, the client device 110, the computing server 130, and various engines, interfaces, terminals, and machines shown in FIG. 2. While FIG. 10 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1024 that specify actions to be taken by that machine. Further, while only a single machine is illustrated, the term "machine" and "computer" may also be taken to include any collection of machines that individually or jointly execute instructions 1024 to perform any one or more of the methodologies discussed herein.

The example computer system 1000 includes one or more processors 1002 such as a CPU (central processing unit), a GPU (graphics processing unit), a TPU (tensor processing unit), a DSP (digital signal processor), a system on a chip (SOC), a controller, a state equipment, an application-specific integrated circuit (ASIC), a field-programmable gate array (FPGA), or any combination of these. Parts of the computing system 1000 may also include a memory 1004 that store computer code including instructions 1024 that may cause the processors 1002 to perform certain actions when the instructions are executed, directly or indirectly by the processors 1002. Instructions can be any directions, commands, or orders that may be stored in different forms, such as equipment-readable instructions, programming instructions including source code, and other communication signals and orders. Instructions may be used in a general sense and are not limited to machine-readable codes. One or more steps in various processes described may be performed by passing through instructions to one or more multiply-accumulate (MAC) units of the processors.

One and more methods described herein improve the operation speed of the processors 1002 and reduces the space required for the memory 1004. For example, the map rendering techniques and loading of index in web browser described herein reduce the complexity of the computation of the processors 1002 by applying one or more novel techniques that simplify the steps in rendering map elements and generating results of the processors 1002. The algorithms described herein also reduces the size of the models and datasets to reduce the storage space requirement for memory 1004.

The performance of certain operations may be distributed among more than one processor, not only residing within a single machine, but deployed across a number of machines. In some example embodiments, the one or more processors or processor-implemented modules may be located in a single geographic location (e.g., within a home environment, an office environment, or a server farm). In other example embodiments, one or more processors or processor-implemented modules may be distributed across a number of geographic locations. Even though in the specification or the claims may refer some processes to be performed by a processor, this should be construed to include a joint operation of multiple distributed processors.

The computer system 1000 may include a main memory 1004, and a static memory 1006, which are configured to communicate with each other via a bus 1008. The computer system 1000 may further include a graphics display unit 1010 (e.g., a plasma display panel (PDP), a liquid crystal display (LCD), a projector, or a cathode ray tube (CRT)). The graphics display unit 1010, controlled by the processors 1002, displays a graphical user interface (GUI) to display one or more results and data generated by the processes described herein. The computer system 1000 may also include alphanumeric input device 1012 (e.g., a keyboard), a cursor control device 1014 (e.g., a mouse, a trackball, a joystick, a motion sensor, or other pointing instruments), a storage unit 1016 (a hard drive, a solid-state drive, a hybrid drive, a memory disk, etc.), a signal generation device 1018 (e.g., a speaker), and a network interface device 1020, which also are configured to communicate via the bus 1008.

The storage unit 1016 includes a computer-readable medium 1022 on which is stored instructions 1024 embodying any one or more of the methodologies or functions described herein. The instructions 1024 may also reside, completely or at least partially, within the main memory 1004 or within the processor 1002 (e.g., within a processor's cache memory) during execution thereof by the computer system 1000, the main memory 1004 and the processor 1002 also constituting computer-readable media. The instructions 1024 may be transmitted or received over a network 1026 via the network interface device 1020.

While computer-readable medium 1022 is shown in an example embodiment to be a single medium, the term "computer-readable medium" should be taken to include a single medium or multiple media (e.g., a centralized or distributed database, or associated caches and servers) able to store instructions (e.g., instructions 1024). The computer-readable medium may include any medium that is capable of storing instructions (e.g., instructions 1024) for execution by the processors (e.g., processors 1002) and that cause the processors to perform any one or more of the methodologies disclosed herein. The computer-readable medium may include, but not be limited to, data repositories in the form of solid-state memories, optical media, and magnetic media. The computer-readable medium does not include a transitory medium such as a propagating signal or a carrier wave.

ADDITIONAL CONSIDERATIONS

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any feature mentioned in one claim category, e.g., method, can be claimed in another claim category, e.g., computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject matter may include not only the combinations of features as set out in the disclosed embodiments but also any other combination of features from different embodiments. Various features mentioned in the different embodiments can be combined with explicit mentioning of such combination or arrangement in an example embodiment or without any explicit mentioning. Furthermore, any of the embodiments and features described or depicted herein may be claimed in a separate claim and/or in any combination with any embodiment or feature described or depicted herein or with any of the features.

Some portions of this description describe the embodiments in terms of algorithms and symbolic representations of operations on information. These operations and algorithmic descriptions, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

Any of the steps, operations, or processes described herein may be performed or implemented with one or more hardware or software engines, alone or in combination with other devices. In some embodiments, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed in the specific order claimed or described in the disclosure. Some steps may be performed before others even though the other steps are claimed or described first in this disclosure. Likewise, any use of (i), (ii), (iii), etc., or (a), (b), (c), etc. in the specification or in the claims, unless specified, is used to better enumerate items or steps and also does not mandate a particular order.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. In addition, the term "each" used in the specification and claims does not imply that every or all elements in a group need to fit the description associated with the term "each." For example, "each member is associated with element A" does not imply that all members are associated with an element A. Instead, the term "each" only implies that a member (of some of the members), in a singular form, is associated with an element A. In claims, the use of a singular form of a noun may imply at least one element even though a plural form is not used.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The following applications are incorporated by reference in their entirety for all purposes: (1) U.S. Pat. No. 10,679,729, entitled "Haplotype Phasing Models," granted on Jun. 9, 2020, (2) U.S. Pat. No. 10,223,498, entitled "Discovering Population Structure from Patterns of Identity-By-Descent," granted on Mar. 5, 2019, (3) U.S. Pat. No. 10,720,229, entitled "Reducing Error in Predicted Genetic Relationships," granted on Jul. 21, 2020, (4) U.S. Pat. No. 10,558,930, entitled "Local Genetic Ethnicity Determination System," granted on Feb. 11, 2020, (5) U.S. Pat. No. 10,114,922, entitled "Identifying Ancestral Relationships Using a Continuous Stream of Input," granted on Oct. 30, 2018, (6) U.S. Pat. No. 11,429,615, entitled "Linking Individual Datasets to a Database," granted on Aug. 30, 2022, (7) U.S. Pat. No. 10,692,587, entitled "Global Ancestry Determination System," granted on Jun. 23, 2020, and (8) U.S. Patent Application Publication No. US 2021/0034647, entitled "Clustering of Matched Segments to Determine Linkage of Dataset in a Database," published on Feb. 4, 2021.

What is claimed is:

1. A computer-implemented method, comprising:
    loading a digital map;
    loading an index comprising historical map metadata, wherein the historical map metadata comprise boundary coordinates of historical maps and identifiers of historical map images, the historical map images being digitalized images of physical maps;
    receiving a user input interacting with the digital map;
    determining, based on the user input, a view area of the digital map, the view area corresponding to a geographical area and a zoom level on the digital map;
    looking up the index to determine one or more particular historical maps that fall within the view area of the digital map, looking up the index comprising examining whether the boundary coordinates of the historical maps fall within the geographical area corresponding to the view area at the zoom level;
    retrieving, from a data source and based on the identifiers of historical map images stored in the index, one or more historical map images corresponding to the one or more particular historical maps that fall within the view area of the digital map; overlaying the one or more historical map images onto the digital map; and
    loading a georeferenced shape polygon file, wherein the georeferenced shape polygon file comprises coordinates of polygons that correspond to districts in the historical maps, wherein the georeferenced shape polygon file comprises a plurality of polygons, and wherein each of the polygons is associated with a historical map district identifier and a historical map identifier from where the polygon is derived.

2. The method of claim 1, further comprising rendering one or more historical districts on a historical map image that is overlaying on the digital map.

3. The method of claim 1, further comprising:
receiving, from a user, a selection of a particular historical district via a user interface that displays the digital map; and
displaying genealogy records of one or more individuals whose records are associated with the particular historical district.

4. The method of claim 1, wherein one of the historical maps is a physical map included in a census record and one of the districts in the historical map is an enumeration district.

5. The method of claim 1, wherein the historical map metadata comprises a plurality of polygons, and wherein each of the polygons comprises shape data, georeferenced data, city, state, and/or county data.

6. The method of claim 1, further comprising receiving a centroid file, the centroid file comprising data regarding centroids of the historical maps.

7. The method of claim 6, further comprising generating a cluster view on the digital map, the cluster view comprising statistics of a number of historical maps in an area based on the centroids of the historical maps.

8. The method of claim 1, wherein the user input is one of the following: searching for a geographical address, providing a subject's name, selecting a zoom level and a location on the digital map, searching for Census records or genealogy records of a subject, searching for a family tree of a subject, providing a census enumeration district ID, and/or clicking on a clustering of historical map images.

9. A non-transitory computer-readable medium configured to store code comprising instructions, wherein the instructions, when executed by one or more processors, cause the one or more processors to perform steps comprising:
loading a digital map;
loading an index comprising historical map metadata, wherein the historical map metadata comprise boundary coordinates of historical maps and identifiers of historical map images, the historical map images being digitalized images of physical maps;
receiving a user input interacting with the digital map;
determining, based on the user input, a view area of the digital map, the view area corresponding to a geographical area and a zoom level on the digital map;
looking up the index to determine one or more particular historical maps that fall within the view area of the digital map, looking up the index comprising examining whether the boundary coordinates of the historical maps fall within the geographical area corresponding to the view area at the zoom level;
retrieving, from a data source and based on the identifiers of historical map images stored in the index, one or more historical map images corresponding to the one or more particular historical maps that fall within the view area of the digital map;
overlaying the one or more historical map images onto the digital map; and
loading a georeferenced shape polygon file, wherein the georeferenced shape polygon file comprises coordinates of polygons that correspond to districts in the historical maps, wherein the georeferenced shape polygon file comprises a plurality of polygons, and wherein each of the polygons is associated with a historical map district identifier and a historical map identifier from where the polygon is derived.

10. The non-transitory computer-readable medium of claim 9, wherein the steps further comprise rendering one or more historical districts on a historical map image that is overlaying on the digital map.

11. The non-transitory computer-readable medium of claim 9, wherein the steps further comprise:
receiving, from a user, a selection of a particular historical district via a user interface that displays the digital map; and
displaying genealogy records of one or more individuals whose records are associated with the particular historical district.

12. The non-transitory computer-readable medium of claim 9, wherein one of the historical maps is a physical map included in a census record and one of the districts in the historical map is an enumeration district.

13. The non-transitory computer-readable medium of claim 9, wherein the historical map metadata comprises a plurality of polygons, and wherein each of the polygons comprises shape data, georeferenced data, city, state, and/or county data.

14. The non-transitory computer-readable medium of claim 9, wherein the steps further comprise receiving a centroid file, the centroid file comprising data regarding centroids of the historical maps.

15. The non-transitory computer-readable medium of claim 14, wherein the steps further comprise generating a cluster view on the digital map, the cluster view comprising statistics of a number of historical maps in an area based on the centroids of the historical map.

16. A system comprising:
a computing server comprising memory that stores an index comprising historical map metadata, wherein the historical map metadata comprise boundary coordinates of historical maps and identifiers of historical map images, the historical map images being digitalized images of physical maps; and
a user interface in communication with the computing server, the user interface configured to perform steps comprising:
loading a digital map;
loading the index transmitted from the computing server;
receiving a user input interacting with the digital map;
determining, based on the user input, a view area of the digital map, the view area corresponding to a geographical area and a zoom level on the digital map;
looking up the index to determine one or more particular historical maps that fall within the view area of the digital map, looking up the index comprising examining whether the boundary coordinates of the historical maps fall within the geographical area corresponding to the view area at the zoom level;
retrieving, from a data source and based on the identifiers of historical map images stored in the index, one or more historical map images corresponding to the one or more particular historical maps that fall within the view area of the digital map;
overlaying the one or more historical map images onto the digital map; and
loading a georeferenced shape polygon file, wherein the georeferenced shape polygon file comprises coordinates of polygons that correspond to districts in the historical maps, wherein the georeferenced shape polygon file comprises a plurality of polygons, and wherein each of the polygons is associated with a historical map district identifier and a historical map identifier from where the polygon is derived.

* * * * *